United States Patent [19]
Thompson

[11] 3,795,929
[45] Mar. 12, 1974

[54] VEHICLE WASHING APPARATUS

[75] Inventor: William H. Thompson, Mt. Prospect, Ill.

[73] Assignee: Trans-Clean, Inc., Glenview, Calif.

[22] Filed: Mar. 20, 1972

[21] Appl. No.: 236,496

Related U.S. Application Data

[63] Continuation-in-part of Ser. No. 189,682, Oct. 15, 1971.

[52] U.S. Cl. .............................. 15/21 E, 15/DIG. 2
[51] Int. Cl. .............................................. B60s 3/06
[58] Field of Search ............ 15/DIG. 2, 21 D, 21 E, 15/53, 97 R, 302

[56] References Cited
UNITED STATES PATENTS

| | | | |
|---|---|---|---|
| 3,300,803 | 1/1967 | Seakan | 15/21 E |
| 3,501,794 | 3/1970 | Solomon | 15/21 D |
| 3,624,851 | 12/1971 | Barber | 15/21 D |
| 3,456,275 | 7/1969 | Solomon | 15/21 D |

*Primary Examiner*—Edward L. Roberts
*Attorney, Agent, or Firm*—Charles E. Quarton

[57] ABSTRACT

An apparatus for washing a stationary vehicle. A mobile carriage travels along a longitudinal path over the vehicle. The carriage supports opposing vehicle washing brushes rotatable about laterally movable vertical axes to wash the vertical surfaces of the vehicle, an overhead brush rotatable about a horizontal axis and movable in a vertical direction to wash the upper surfaces of the vehicle, and horizontally mounted opposed rotatable brushes for washing the windows and upper vertical surfaces of the vehicle. The vertically mounted brushes are suspended from the carriage by a linkage which has a natural pendular position urging the brushes into scrubbing contact with the vehicle. The overhead brush linkage includes a novel structure wherein counterbalancing weights are located wholly within the lateral limits of the carriage, and wherein the motor driving the overhead brush is mounted so as to eliminate the motor torque reaction when the direction of brush rotation is reversed. A control system comprising sensing elements responsive to the physical dimensions of the vehicle automatically programs the functions of the washing apparatus. A unique feature of the control system provides for stopping rearward movement of the carriage when the rear of the vehicle has been reached by the brushes, regardless of the length of the vehicle. A second unique feature of the control system prevents the carriage from stopping as it reaches the rear of the vehicle until the overhead brush cleans the rear window or upper rear vertical surface of station wagons or vans.

6 Claims, 18 Drawing Figures

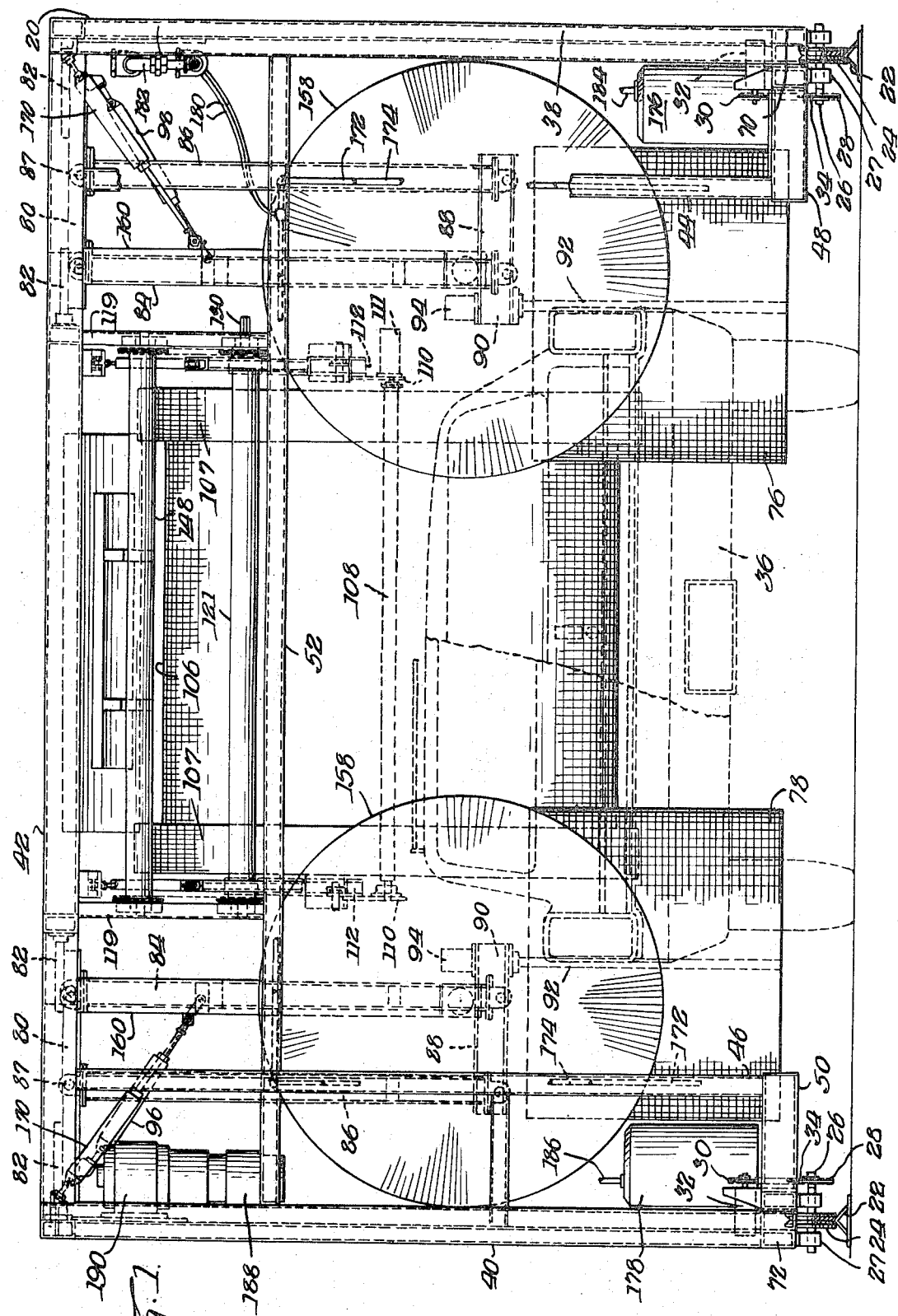

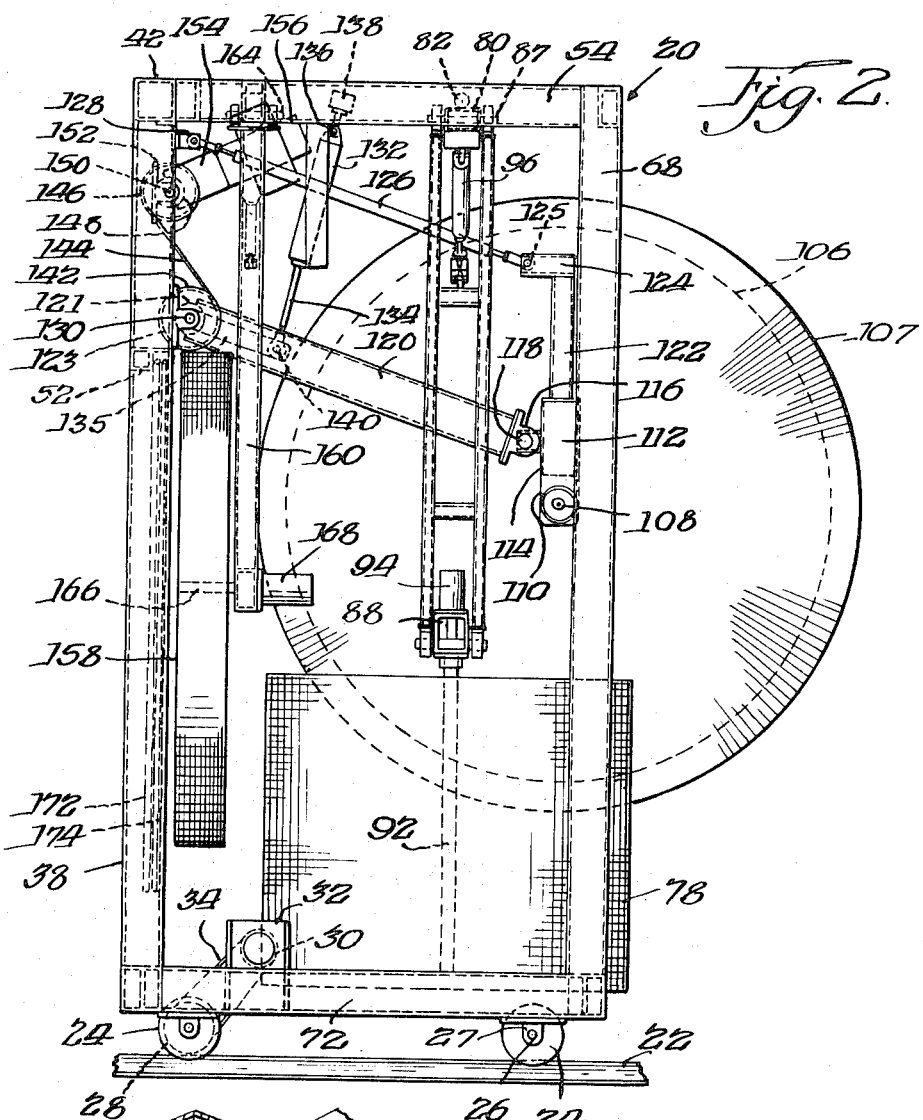
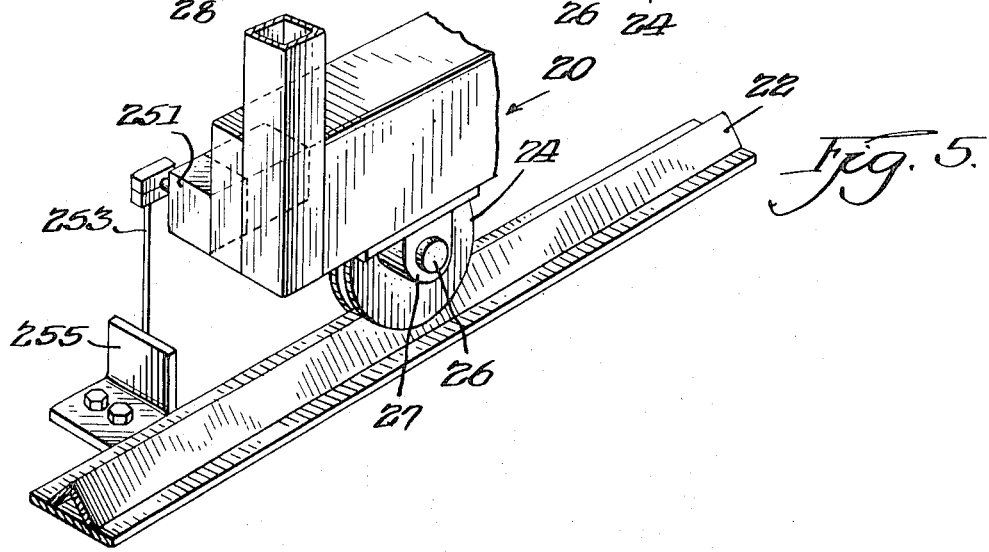

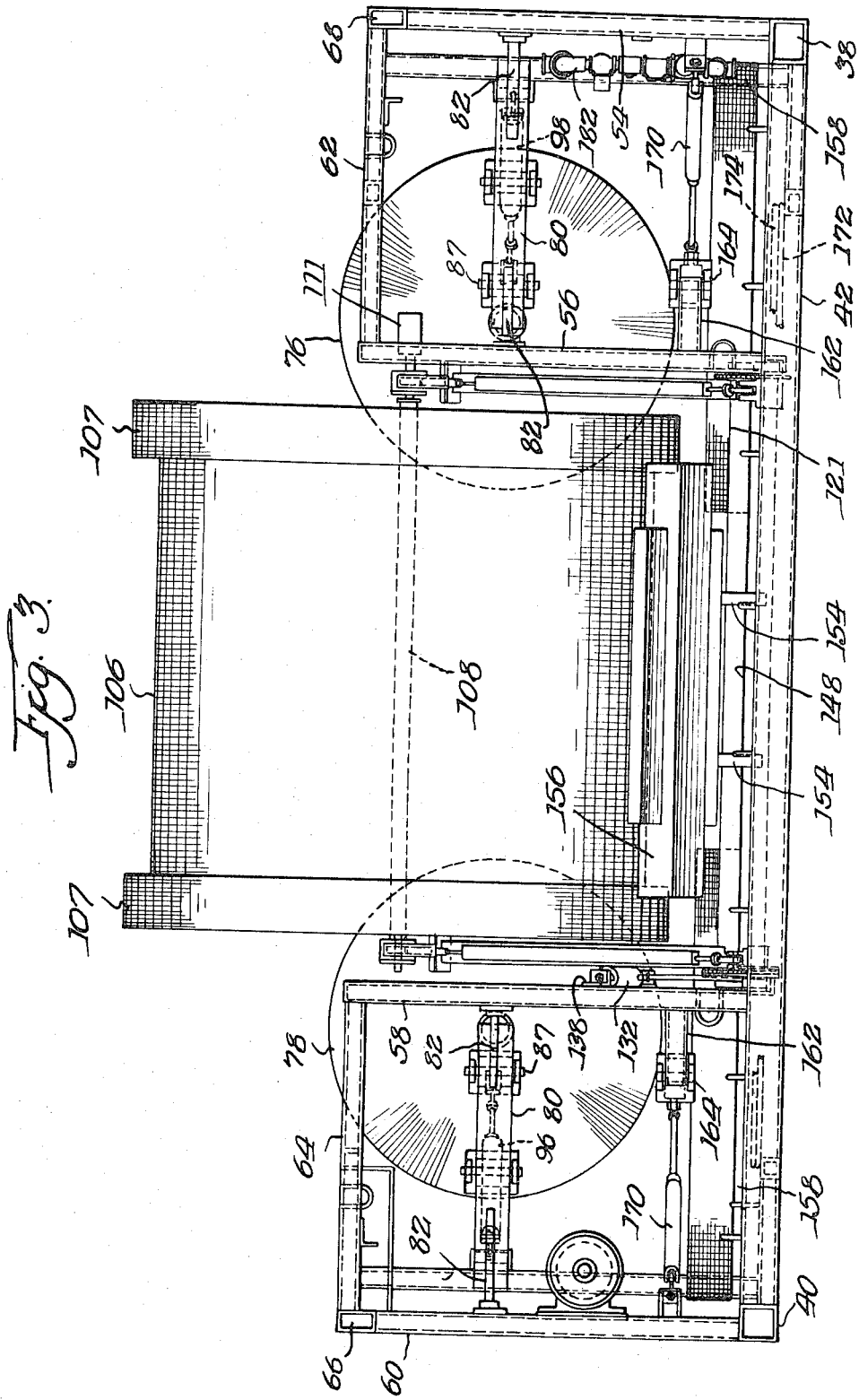

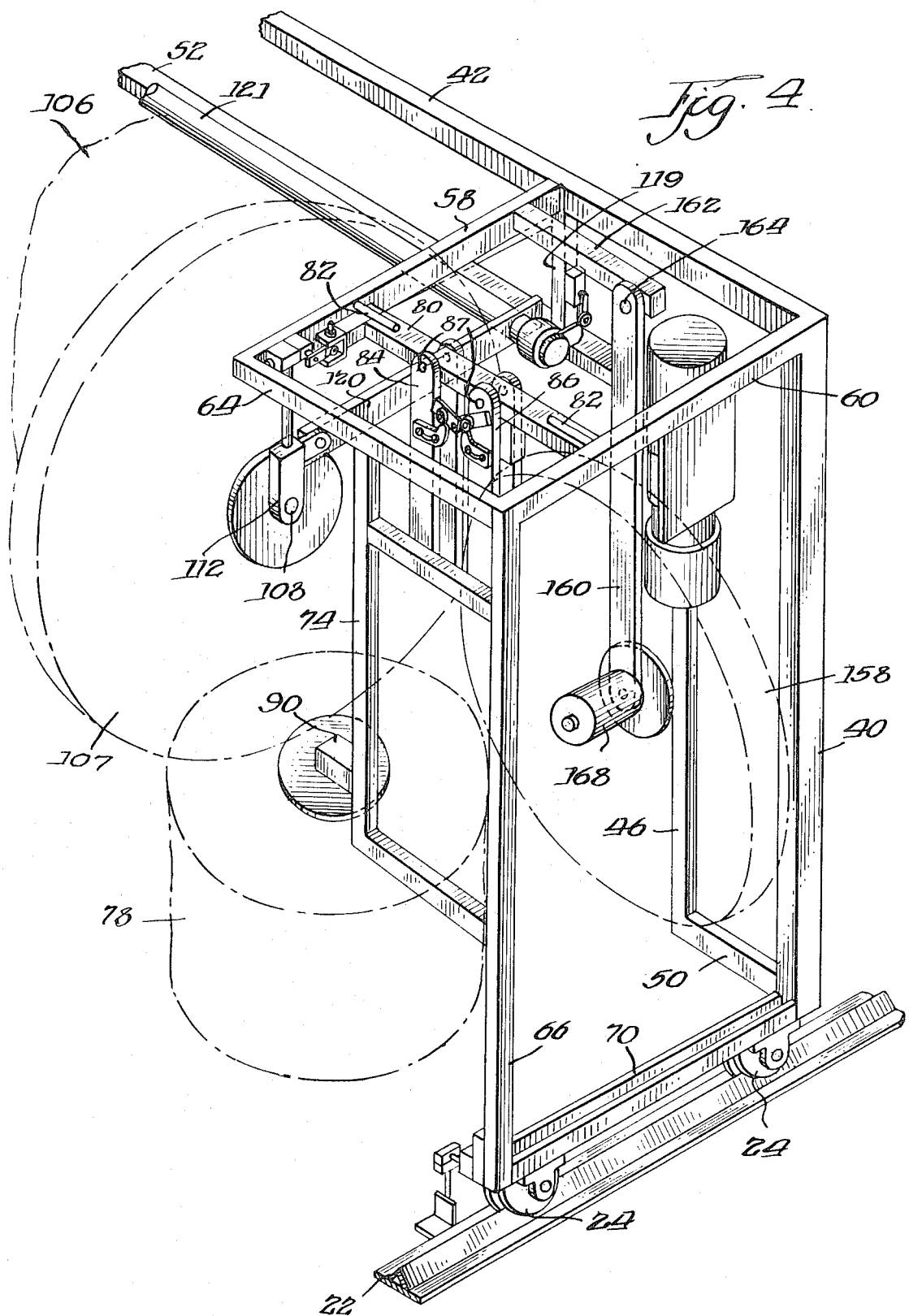

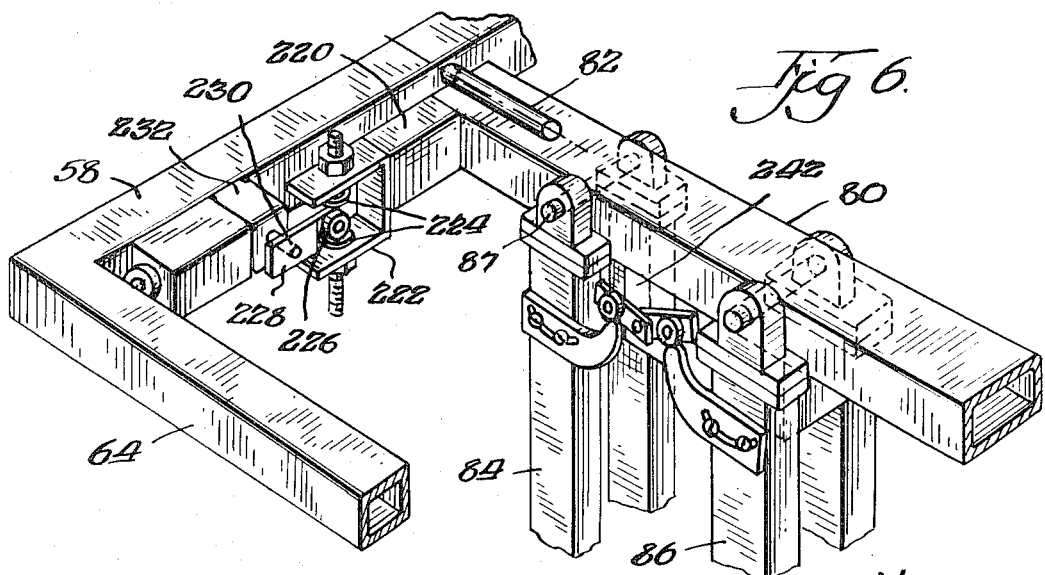
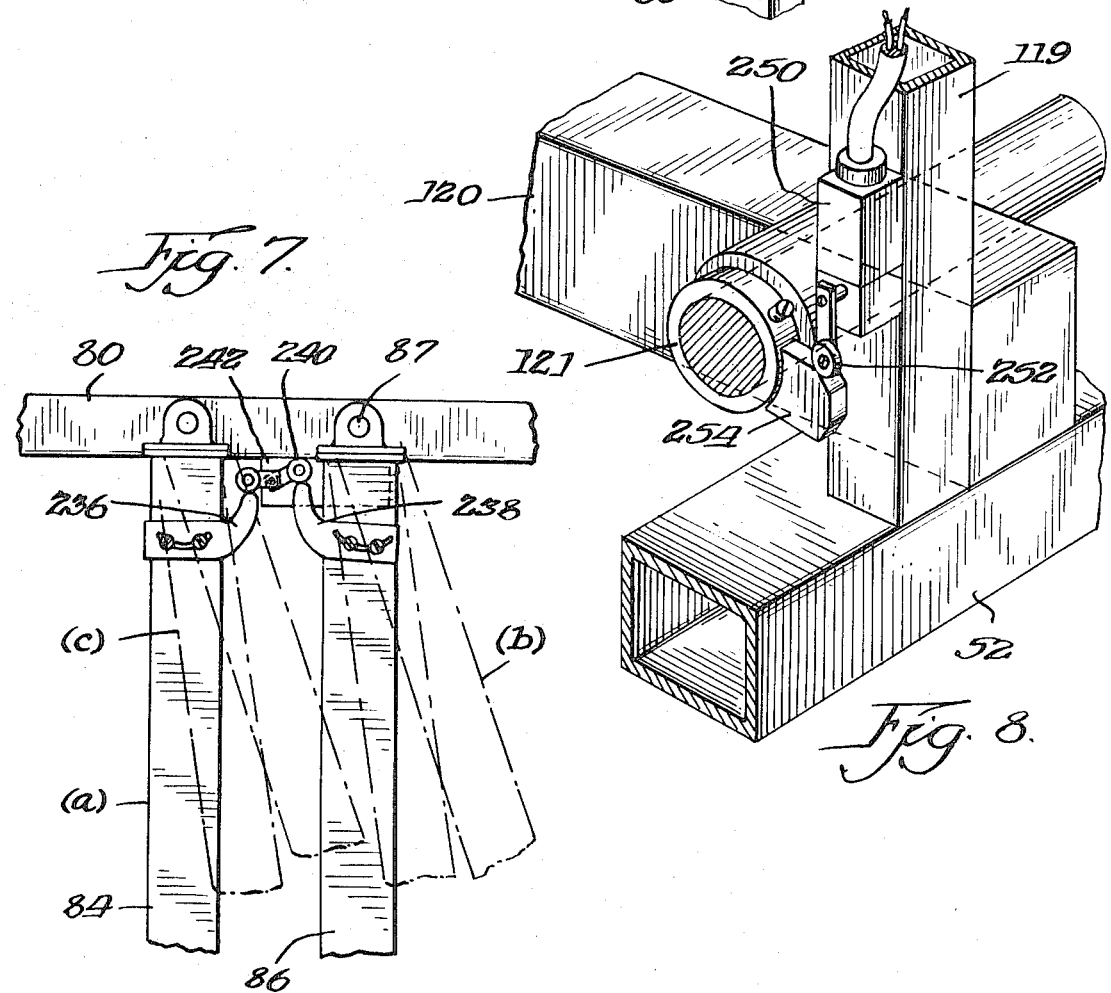

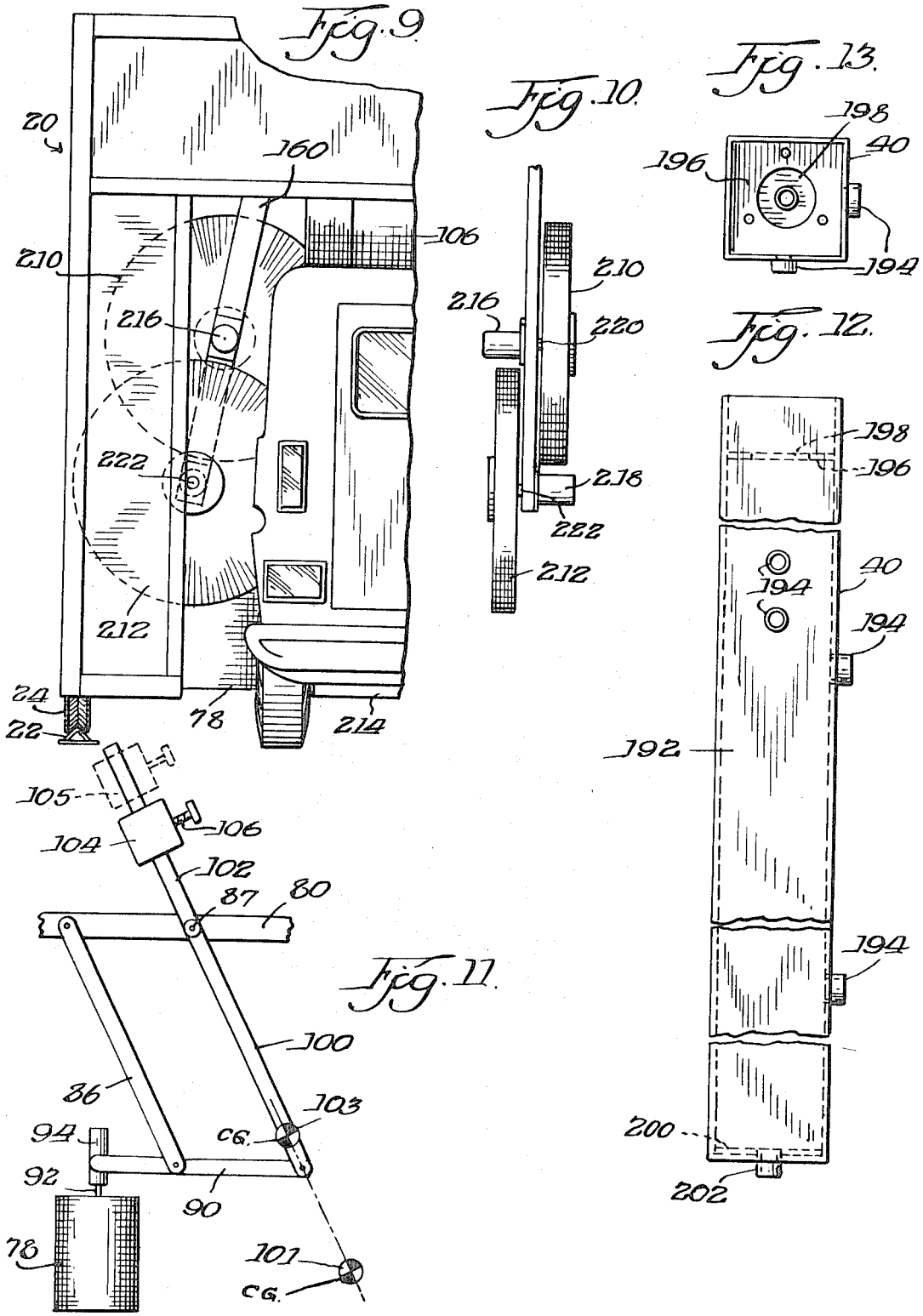

Fig. 15.

| COMPLETED EVENTS | STEP SWITCH POSITION | | | | | | | | | | | | | ROTARY SWITCH | SENSOR ACTIVE | SENSOR FUNCTION |
|---|---|---|---|---|---|---|---|---|---|---|---|---|---|---|---|
| | RESET CIRCUIT | SIDE BRUSHES ROTATE REAR | SIDE BRUSHES IN | WINDOW BRUSHES OUT & TOP BRUSH UP | WINDOW BRUSHES IN & TOP BRUSH DOWN | WINDOW BRUSHES, TOP BRUSH (TRAVEL, ROTATE TO FRONT) | WINDOW BRUSHES, TOP BRUSH (TRAVEL, ROTATE TO REAR) | DETERGENT | WAX & RINSE | PUMP MOTOR STARTER & SIDE BRUSHES ROTATE FWD | STOP LIGHT | GO LIGHTS & ACCESSORIES | | | |
| FUNCTION CONTROLLED | PB1 251 | SOL.1 | SOL.2 | SOL.3 | SOL.4 | SOL.5 | SOL.6 | SOL.7 | SOL.8 | M1 | LT | | | | |
| OPERATES | | | | | | | | | | | | | | | |
| STEP SWITCH No. | 1 | 2 | 3 | 4 | 5 | 6 | 7 | 8 | 9 | 10 | 11 | 12 | | | |
| OFF (HOME) | X | | | | | | | | | | | | RS1 | CB | COIN SWITCH |
| COIN IN | X | | | | | | | | | | | X | RS2 | TD | TREADLE |
| TREADLE DOWN | X | | X | X | | | | X | | X | X | | RS3 | 242 a,b,c | SIDE BRUSHES IN |
| SIDE BRUSHES IN | X | | X | X | | | | X | | X | X | | RS4 | 232 | TILT |
| SIDE BRUSHES TILT | X | X | | X | | | | X | | X | X | | RS5 | TR | TIME RELAY |
| TIME DELAY | X | X | | X | | | X | X | | X | X | | RS6 | 242 b,c,d | SIDE BRUSHES OUT |
| SIDE BRUSHES OUT | X | X | | | X | | | X | | X | X | | RS7 | 242 & 250 | SIDE IN & TOP BRUSH DOWN |
| TOP BRUSH DOWN | X | X | | X | | X | | | X | X | X | | RS8 | TR | TIME RELAY |
| TIME DELAY | X | X | | X | | | | | X | X | X | | RS9 | 232 | TILT |
| TILT | X | X | | X | X | | | | X | X | X | | RS10 | TR | TIME RELAY |
| TIME DELAY | X | | X | | X | | | | X | X | X | | RS11 | 242 b,c,d | SIDE BRUSHES OUT |
| SIDE BRUSHES OUT | X | X | | X | X | | | | | X | X | | RS12 | 242 a,c,c | SIDE BRUSHES IN |
| SIDE BRUSHES IN | X | X | | X | | | X | | | X | X | | RS13 | TR | TIME RELAY |
| TIME DELAY | X | X | | X | | X | | | | X | X | | RS14 | 242 b,c,d | SIDE BRUSHES OUT |
| SIDE BRUSHES OUT | X | | | X | | | | | | X | X | | RS15 | 251 | HOME |
| HOME | | | | | | | | | | | | | | | |

VEHICLE WASHING APPARATUS

This application is a continuation-in-part application of copending application Ser. No. 189,682 filed Oct. 15, 1971 by William H. Thompson.

This invention relates to apparatus for automatically washing a stationary vehicle. In particular, the invention comprises a carriage supporting rotary washing means which are displaceable relative to the vertical and upper surfaces of a vehicle, whereby the carriage reciprocally travels longitudinally along the vehicle to be washed. However, as will be described, certain novel features of the present invention may also be applied to vehicle washing devices wherein the vehicle moves through a stationary washing apparatus.

Present vehicle washing installations are basically of two types. In one such structure, a vehicle to be washed is moved on a conveyorized path through a stationary installation comprising one or more bays or stations where saponated water is applied, brushes move into contact with the car, rinse water and wax is applied, and an optional drying facility is provided. Many such installations, known as conveyorized washing units, are presently in use. However, it has been discovered that by maintaining the vehicle stationary while passing a washing apparatus along the vehicle, an efficient and economical vehicle washing facility can be installed in a smaller space than occupied by a conveyorized unit. These latter structures, known as "rollover" units, enable the installation of a vehicle washing apparatus in a single service bay commonly found in the typical service station, enabling the proprietors of the service station to provide a satisfactory car wash service to their patrons within the physical limits of existing facilities. Examples of such rollover units are described in Seakan U.S. Pat. No. 3,428,983 and Cirino et al U.S. Pat. No. 3,238,551.

The present invention provides an improved rollover vehicle washing unit which includes many novel features not found on existing structures, and which features provide a more efficient, economical, automatic vehicle washing apparatus than presently known. As will be described, certain of the novel features of the present invention may be applied to vehicle washing units of the conveyorized type; however, for convenience of description, these features are illustrated in the embodiment of a rollover type vehicle washing apparatus.

Known vehicle washing units comprise rotary brush elements mounted on horizontally displaceable support mechanisms, including parallelogram linkage means pivotally supporting the brush elements, as disclosed for example, in Fuhring U.S. Pat. No. 3,304,565. In these devices an extraneous force must be applied to maintain the vertically mounted brushes in scrubbing contact with the vehicle as the washing apparatus passes over the vehicle. Further, known vertical brush linkage systems in vehicle washing devices frequently employ an angularly mounted counterweight to vary the natural brush pressure against the vehicle surfaces. These counterweights are subject to adjustment, and when adjusted, result in changing the natural pendular position of the brush and linkage assembly, thereby varying the pressure exerted against the vehicle surface by the brush. Also, a shock absorber is sometimes utilized in the vertical brush support linkage to dampen quick movement of the counterbalanced assembly as the rollover unit moves and its brushes come into contact with the vehicle.

The overhead, horizontally disposed rotary brush assembly in many present automatic vehicle washing units includes a reversible brush drive motor located on the brush support linkage such that an undesirable reaction torque is produced tending to lift the brush vertically when the motor is reversed. This force opposes the pressure elements used to maintain the overhead brush in contact with the upper surfaces of the vehicle, and may cause permanent damage to these elements. Also, counterweights for balancing the weight of overhead brushes in present units are placed outside the lateral extent of the pivotal arms supporting the brush, and are sometimes located beyond the lateral extent of the rollover unit itself. Such construction sacrifices economy of space in that the counterweight is located adjacent the mechanical structures supporting the remaining brushes, or their location requires additional lateral space in which to install the unit.

Many currently available vehicle washing units also provide opposed horizontally mounted brushes for washing the vertical surfaces of the vehicle above the window sill and below the roof line of the vehicle. These brushes are usually mounted for movement with the side or vertical brushes of the unit, which does not provide for any degree of independent movement. Further, where a horizontally mounted window brush is used, only one brush is furnished for each side, and this brush usually rotates in only one direction. This construction fails to provide for efficient washing of the entire vertical surface of the vehicle, especially the shelf portion of the vehicle which extends horizontally beneath the window of late model automobiles. Further, a single brush is incapable of efficiently cleaning taller vehicles such as vans, and also smaller cars. In addition, a horizontal mounted window brush which is unable to operate in a reverse rotative direction may cause damage to a protruding radio antenna, mirror or the like.

The control systems found on certain known automatic rollover vehicle washing units consist of sensing elements which are responsive to the position of the brushes relative to the surface of the vehicle. These sensing elements, when actuated by a predetermined brush movement, signal to a master control device which then changes position to sequence the next operation of the washing apparatus. However, in present vehicle washing devices the control systems do not take into account the varying lengths of vehicles to be washed, and do not provide means for sensing the length of a vehicle and stopping rearward movement of the apparatus without overriding the vehicle. Such units provide a mobile carriage which continues movement along the vehicle until a predetermined point is reached relative to the floor, irrespective of the length of the vehicle. If a compact or short vehicle is in the washing bay, water and soap is wasted by being sprayed over the floor of the washing facility as the carriage moves past the rear of the vehicle.

In addition, present automatic vehicle washing units provide means for raising the overhead, horizontally disposed brush when the rear of the vehicle has been reached. When these units are utilized to clean station wagons or vans with vertical surfaces reaching to the roof of the vehicle, the horizontally mounted upper brush is raised before the rear window or upper rear surface of the wagon or van can be washed by the overhead brush. As a result, a complete cleaning of the rear surface of vans and station wagons is beyond the capability of present day vehicle washing devices.

The positioning of brush elements in certain present vehicle washing devices is accomplished by air pressure components which are reliable when furnished with clean, well lubricated air, but normally fail when provided with the quality of air provided in an average service station. I have discovered that hydraulic cylinders can be controlled more smoothly and can provide a more efficiently controlled washing action than air operated components.

It is a primary object of the present invention to alleviate the foregoing problems in known automatic vehicle washing apparatus by providing a vehicle washing unit which includes vertically disposed side brushes for washing the vertical surfaces of the vehicle, which brushes are positioned and structured to be loaded by their own gravity to bear against the car solely due to the weight of the brush and its support assembly. It is a further object of an embodiment of the present invention to provide a slidable balance weight acting on the center line of a side brush support arm in a vehicle washing apparatus whereby brush pressure against the vehicle surfaces may be varied without altering the natural pendular position of the arm and brush assembly, thus eliminating the need for a shock absorber to dampen the motion of the side brush assembly.

An additionaly object of the present invention is to provide an automatic vehicle washing unit comprising a support linkage system for an overhead reversible rotary brush whereby a motor for rotating the brush is so located to eliminate the motor torque reaction force tending to raise the brush and its linkage when the brush direction is reversed. Further, counterweight for balancing the weight of the overhead brush are disposed within the lateral limits of the washing apparatus and within the arms supporting the overhead brush. This reduces the lateral space required to install and operate the auto washing unit, and prevents the interference of the counterweights with the operation of the remaining mechanical components of the unit.

It is a further object of the present invention to provide a vehicle washing apparatus including independently mounted, horizontally disposed, rotatable brushes for cleaning the windows in vehicles without damaging protruding elements such as radio aerials or side mounted mirrors. In one embodiment of my invention, a horizontal brush unit is provided having a plurality of rotating brush elements for efficiently cleaning the upper vertical side surfaces of taller vehicles such as vans, small trucks and buses.

Still another object of the present invention is to provide an automatic vehicle washing apparatus for traveling along a stationary vehicle to be washed which includes a control system which prevents the cessation of rearward travel of the apparatus over a station wagon or van type vehicle until the overhead brush element has lowered to wash the rear window or upper vertical surfaces of the rear of such station wagon or van.

A further object of the present invention is to provide an apparatus of the type described whereby the entire operation and sequencing of the automatic features of the washing unit are controlled by sensing mechanisms responsive to the position of the brushes and their respective support arms in relation to the surface of the vehicle. Further, the present invention provides means for stopping rearward travel of the travel washing apparatus when the rear of the vehicle has been reached by the vertically mounted side brushes of the apparatus, irrespective of the length of the vehicle being washed.

Still another object of the present invention is to provide a self-contained control system for a vehicle washing apparatus which eliminates the need for external hydraulic power sources and external electrical control panels. Also, the present apparatus comprises prelubricated and sealed bearings, which provides a lower level of maintenance and operating demands.

The vehicle washing apparatus as herein described provides ease of maintenance and operation since all moving parts operate through bearing means which are provided with adequate lubrication facilities. The brush assemblies may be easily removed and replaced when worn. All other parts which may in time show the effects of wear over a prolonged usage may be replaced simply and effortlessly.

Another object of the invention is to provide a hydraulic control system for operating the vehicle washing apparatus and thereby effecting the positioning and rotation of the brushes in the apparatus and the travel of vehicle washing apparatus along a vehicle to be washed.

Another object of the invention is to provide an electrical control system having a safety circuit for delaying initiation of a wash cycle until a given time after the vehicle to be washed is properly positioned in the vehicle washing apparatus and for resetting the vehicle washing apparatus if a vehicle being washed drives away after a wash cycle is initiated.

These and other objects of the present invention will become apparent upon the reading of the following detailed description of the preferred embodiments of this invention, which are illustrated in the accompanying drawings in which:

FIG. 1 is a front elevation view of one form of the vehicle washing apparatus of the present invention;

FIG. 2 is a side elevation view of the unit of FIG. 1;

FIG. 3 is a top plan view of the unit of FIG. 1;

FIG. 4 is a perspective assembly view of a portion of one form of the vehicle washing apparatus of the present invention, illustrating the location of several sensing devices for controlling the operation of the apparatus;

FIGS. 5 through 8 are detail views of the various sensing devices controlling the operation of the present invention;

FIG. 9 is a partial front elevation view of another embodiment of the present invention, wherein two counter-rotating horizontally mounted brush elements are provided on either side of the vehicle for cleaning the upper vehicle sides of tall vehicles;

FIG. 10 is a side elevation view of the horizontally mounted brush elements illustrated in FIG. 9;

FIG. 11 is a modified form of the support linkage for the vertical side brushes of the present invention, providing a movable counterweight to vary the pressure of the brush bearing against a vehicle being washed;

FIG. 12 is a detail view of a hollow support member of the present invention comprising a hydraulic fluid reservoir disposed therein;

FIG. 13 is a top view of the support member of FIG. 12;

FIG. 15 is a chart showing the sequence of operations in a complete wash cycle involving a forward and rearward pass of the washing apparatus over the vehicle to be washed;

Figure 14:
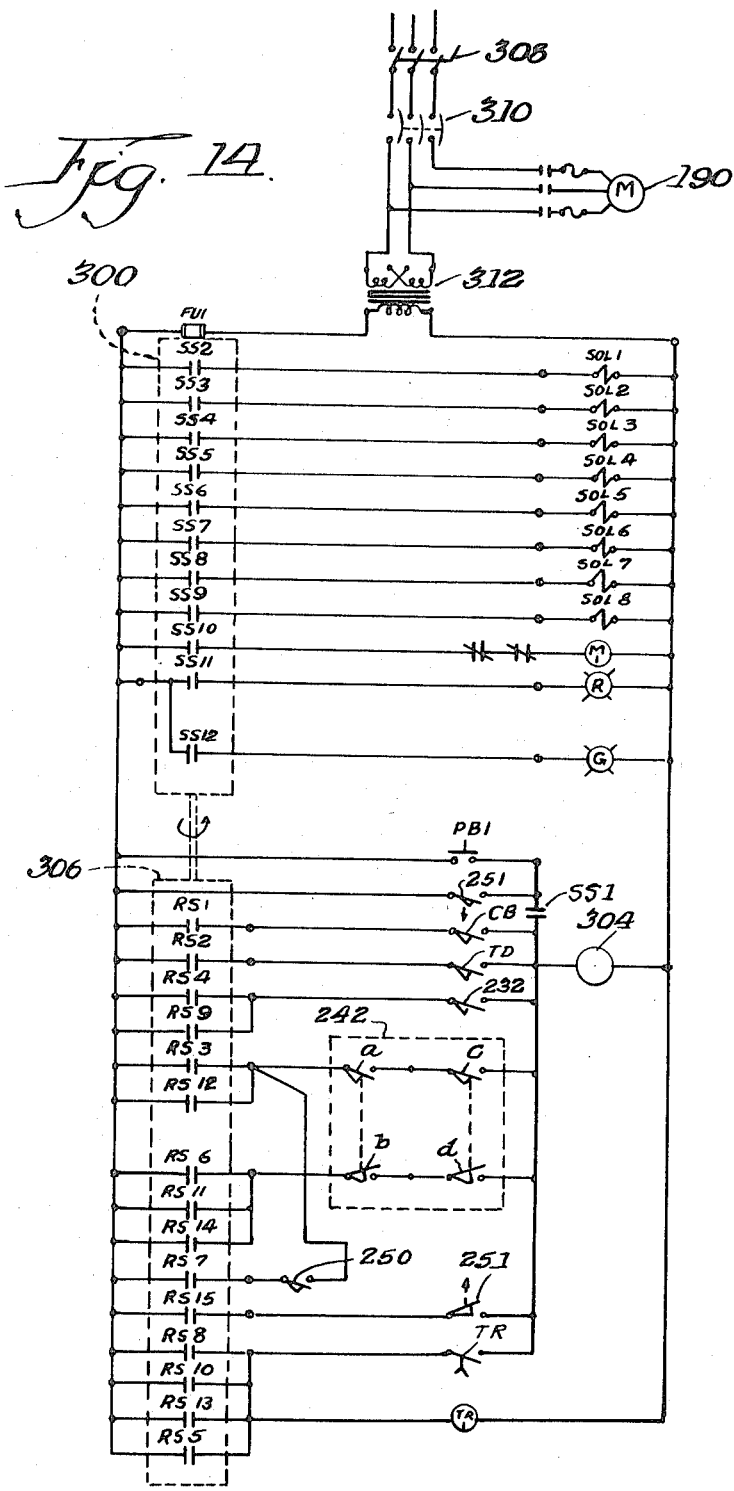
FIG. 14 is an electrical diagram of the control circuits of the present invention.

In the embodiment shown in FIGS. 1, 2 and 3, there is shown a traveling carriage or gantry structure 20 designed to move over parallel tracks 22 which are located lengthwise along the floor of a washing facility, such as the service bay of a typical gasoline station. Wheels 24 are rotatably affixed to carriage 20 by means of axles 26 and support blocks 27 to permit travel of the carriage along tracks 22. As seen in FIG. 2, wheels 24 are disposed at the four corner locations of the carriage to provide stability to the structure.

Two of the axles 26 are provided with sprocket wheels 28 which are aligned with sprocket wheels 30 driven by two hydraulically operated reversible motor means 32 mounted on the frame of carriage 20. Chains 34 drivingly connected each of the two sets of sprocket wheels 28, 30 and motor means 32. It is readily apparent that actuation of both motor means 32 will cause the carriage to move either forward or rearward along tracks 22.

The carriage 20 comprises generally an inverted U-shaped frame designed to be disposed adjacent and above a stationary centrally disposed vehicle 36 to be washed. Vehicle 36 is depicted in cutaway phantom view in FIG. 1 as a sedan (right side) and a station wagon (left side) since an important feature of the present invention is the unique manner in which the washing unit insures that the rear windows of station wagons and vans are properly cleaned. When the vehicle is located in the washing facility the carriage 20 is initially disposed forward of the front end of the vehicle. The carriage 20 comprises opposed vertical column members 38 and 40, and an overhead connecting member 42. Vertical beam members 44 and 46 (FIGS. 1, 4) are provided inward of column members 38 and 40, and are connected at the bottom thereof by members 48, 50. The top of members 44 and 46 are rigidly affixed to horizontal cross beam 52. As best seen in FIGS. 2, 3 and 4, further rigidity and strength for carriage 20 is provided by rearwardly extending beam members 54, 56, 58 and 60, and transverse connecting beam members 62, 64. Rearwardly disposed vertical beam members 66, 68 (FIG. 3) extend downward from the joint formed by members 60 and 64, and 54 and 62 respectively, and are supported by rearward extending base support members 70, 72 respectively (FIG. 2). An insert frame unit 74 (FIG. 4) is provided adjacent vertical members 66 and 68, one of which frame units 74 is used to support a control panel (not shown) for the washing apparatus The carriage 20 provides the mounting and supporting structure for the various brush and washing means of the vehicle washing unit of my invention. In the preferred embodiment of FIGS. 1–4, opposed vertically muunted rotatable side brushes 76, 78 are mounted to carriage 20 by means of a parallelogram linkage for pivotal movement in two directions. To this end, each side brush is mounted to carriage 20 by a gimbled support structure comprising an upper pivotal bracket 80 (FIG. 4) which is pivotally mounted between beam members 54, 56 and 58, 60, by means of pin members 82 welded or otherwise suitably affixed to brackets 80. Each brush 76, 78 is supported from bracket 80 by means of two sets of parallel linkage arms 84, 86 which are mounted on pivot pins 87 for pivotal movement relative to bracket 80 in a direction transverse to the direction of travel of the carriage 20. The lower portions of linkage arms 84, 86 are pivotally attached to a horizontal link arm 88 (FIG. 1) which has an extending portion 90 supporting vertical side brush shaft 92. Side brushes 76, 78 are attached for rotation with shafts 92, and hydraulically operated, reversible motors 94 are supported from extending portions 90 of each link arm 88 to provide rotative motion to shafts 92 and side brushes 76, 78. Side brushes 76 and 78 are preferably of the polyethylene bristle type, and have an overall diameter of approximately 36 inches when rotating and extended by centrifugal force. As linkage arms 84, 86 pivot in a direction transverse to the direction of carriage travel, the parallelogram configuration maintains shaft 92 in a vertical disposition, remaining parallel to itself in all positions.

Double-acting hydraulically powered actuator means 96, 98 are located between linkage arms 84 and beam members 54, 60 to provide the means for moving side brushes 76 and 78 about pivot pins 87 in a direction towards and away from the vehicle 36. Actuators 96, 98 are automatically controlled by a hydraulic fluid system responsive to control signals responsive to the position of the brushes relative to the vehicle, in addition to signals indicating the initiation and cessation of the wash cycle, as will be explained.

A novel feature of the present invention resides in the manner in which brushes 76, 78 are supported from brackets 80. The center of gravity of the structure comprising brushes 76 and 78, and their attendant linkage arms 84, 86 and 88, is so located that the force of gravity holds the brushes in their natural pendular position against the side surfaces of vehicle 36. Also, the pivot points 87 are so positioned transversely that each brush 76, 78 will naturally abut even the smallest vehicle. This enables side brushes 76, 78 to scrub the verticle surfaces of the vehicle without the application of extra pressure from outside sources.

The natural pendular position of brushes 76, 78 and the manner in which they are pivoted from carriage 20 combine to enable brushes 76, 78 to "feel" the vehicle being washed, and to change position relative to the surfaces of the vehicle, and irrespective of the position of the carriage. Brushes 76, 78 move in or out laterally about pivot pins 87 in response to the position of the brushes against the side of the vehicle. Brushes 76, 78 are also able to move in a forward-rearward direction about pivot pins 82 in response to contact with the front or rear of the vehicle. As will be described, the motion of brushes 76, 78 about pivot pins 87 and about pivot pins 82 initiates signals which are sent to the control system for the vehicle washing apparatus to program segments of the washing cycle of the apparatus.

An additional embodiment of the linkage structure supporting side brushes 76, 78 is shown in FIG. 11, wherein like parts previously described are identifed with the same numerals. Link arm 84, in the side brush parallelogram supporting linkage comprising members 80, 86, 90 and 84 in FIG. 1, is replaced with link arm 100 which includes a portion 102 extending linearly beyond pivot pin 87. A mass 104 is slidably affixed to extending portion 102 of link arm 100 and held in position by means of set screw 106, or other suitable means. By loosening set screw 106, mass 104 may be positioned linearly along portion 102 of link arm 100, for example to the position shown as 105 in FIG. 11, to vary the force of the couple movement about pivot pin 87. As mass 104 moves outwardly away from pin 87, the force required to move the linkage system, including brush 78, to its natural pendular position becomes greater. However, the center of gravity of the system is moved in a radial direction on a line extending through the pivot point 87 of the system as shown in FIG. 11 where the center of gravity has moved from a first position 101 to a second position 103 as mass 104 is moved to position 105. This construction prevents shifting the natural pendular position of brush 78 while at the same time permitting the operator to vary the force with which brush 78 bears against the vehicle being washed. The center of gravity may similarly be linearly shifted by changing the quantity of mass 104.

Mass 104 also acts as a balance weight for the parallelogram linkage support for brushes 76, 78 when the brushes tend to rotate forwardly or rearwardly about pivot pins 82 due to the acceleration force produced when the carriage 20 abruptly starts or stops. In prior vehicle washing units, shock absorbers of various types have been employed to dampen this tendency of the brushes to move longitudinally, since such movement may prematurely activate one or more of the sensing switches which are responsive to pivotal movement of brushes 76, 78 about pivot pins 82. The structure disclosed in FIG. 11 eliminates the need for such shock absorbers by providing a means to balance the linkage system about pivot pin 82 as well as pivot pin 87. It is also apparent that movable mass 104 may be similarly employed in a structure where a vehicle washing brush is pivotally supported by a single extending arm instead of the parallelogram linkage illustrated in FIG. 11.

For scrubbing the upper, horizontal surfaces of the vehicle, as well as the windshield and rear window, an overhead, horizontally mounted reversibly rotating brush 106 is pivotally supported by a parallelogram structure to carriage 20. As best seen in FIG. 3, overhead brush 106 comprises a central portion of a specified diameter, and two end portions 107 of a larger diameter to reach portions of the vehicle which extend downward in a slanted aspect from the roof.

Brush 106 comprises a central shaft 108 to which the brush bristles are suitably attached. The ends of shaft 108 are mounted for rotation on a pair of vertically disposed flanges 110 disposed at either end of brush 106 and which are affixed to and depend from a pair of vertically disposed link arms 112. Mounted to a flange 110 and shaft 108 is a reversible hydraulic motor 111 which provides rotative motion to brush 106. Link arms 112 each comprise a lower portion 114 which is journaled by means of pillow block 116 and pin 118 (FIG. 2) to substantially hori-zontally extending link arms 120. An upper portion 122 of each link arm 112 includes a flange portion 124 to which second hori-zontally extending link arms 126 are journaled by means of pins 125, said link arms 126 being parallel to link arms 120.

Arms 120 are rigidly affixed to a shaft 121, which is rotatably supported by column members 119 of carriage 20 (FIGS. 1, 4) whereby pivot pins 130 attached to shaft 121 extend through pillow blocks 123, the latter being rigidly attached to column members 119 (FIG. 2). Link arms 126 are pivotally attached to horizonal beam member 42 by means of pins 128. As best seen in FIG. 2, arms 112, 120 and 126 form a parallelogram support linkage for brush 106 enabling the overhead brush to move in a vertical direction relative to carriage 20.

Power operated means including hydraulic cylinder 132 and piston rod 134 are provided to move horizontally mounted brush 106 into and out of contact with the upper surfaces of the vehicle being washed. The upper portion of cylinder 132 is fastened to beam member 58 by means of pivot pin 136 and flange 138 (FIG. 2). One end of piston rod 134 is pivotally affixed by means of pin 140 to an arm member 135 which is rigidily fixed to shaft 121. It will be appreciated that brush 106 may be moved in a vertical direction by applying fluid pressure to one side or the other of the piston in cylinder 132, and as arm member 135 moves in a pivotal mode, link arms 120 rotate to the same angular degree as shaft 121.

A novel counterbalance system is provided by my invention to offset the weight of brush 106 and its related drive and linkage means during movement of the overhead brush into and out of engagement with vehicle 36. This unique counterbalance system is disposed completely between the linkage arms 120 supporting brush 106, thereby eliminating the overall width requirements for the washing installation compared to similar units where the overhead brush counterbalance weights extend beyond the lateral limits of the unit. Also, the present structure provides a unique counterbalance system for an overhead brush which is located on the same side of the pivot point as the brush itself. Therefore, no additional space is required to house the counterbalance means, and there is less chance of counterbalancing mass interfering with other working parts of the apparatus.

The aforesaid counterbalancing system for the overhead brush comprises sprocket wheels 142 rigidly attached to both ends of shaft 121, and link chains 144 extending part way around the circumference of, and in engagement with the teeth of, sprocket wheels 142. One end of each chain 144 is fastened to its respective sprocket wheel near the circumference thereof. The other ends of chains 144 extend part way around and are attached near the circumference of sprocket wheels 146, which in turn are rigidly affixed to shaft 148 (FIG. 2). Shaft 148 is rotatably mounted to column member 119 by means of pins 150 extending through pillow blocks 152, the latter being bolted or otherwise secured to column 119. As best seen in FIGS. 2 and 3, a plurality of arms 154 extend radially outward from shaft 148 and are attached to a mass 156. Mass 156 comprises a plurality of metal plates removably bolted together to permit the removal or addition of mass when the size of brush 106 is changed. The gravity force produced as a result of the length of arms 154 and the total weight of the mass 156 and its supporting structure is designed to be substantially equal to the gravity force produced by the product of the combined weights of brush 106, its attendant drive means and linkage system, and the distance of the center of mass of these components from the center of shaft 121. As brush 106 moves vertically and linkage arms 120 pivot about pins 130 under the control of hydraulic cylinder 132, sprocket wheels 142 cause chains 144 to rotate sprocket wheels 146 and shaft 148 in the opposite rotative direction as shaft 121. This in turn causes mass 156 to move counter-rotatively to the vertical movement of brush 106 and thereby balance the movement of the mass of the brush supporting structure through chains 144 and sprocket wheels 142 and 146. Mass 156 is so distributed that the entire unit which is necessary for proper balancing of brush 106 fits between link arms 120.

As illustrated in FIGS. 1 through 4, shafts 121 and 148 may be disposed in a spaced-apart, parallel relationship, or they may be located coaxial to one another. In such construction, the outer shaft 148 will be shorter than inner shaft 121, and a gear unit, such as an idler gear or one-to-one planetary gear arrangement may be used to operably connect the two shafts for counter-rotation.

The overhead rotary brush linkage system is designed to prevent the brush 106 from rising under the influence of the reaction torque produced when the direction of brush rotation is reversed and the dynamic balance of the overhead brush linkage system is changed. In present auto washing units using similarly mounted overhead brush support linkage means, the drive means for the brush is usually located on one of the substantially horizontal extending arms of the linkage, corresponding to arms 120 and 126 of the present structure. It has been found that when the drive means is reversed, a reverse torque reaction is produced in the arms, which moves the arms upward and raises brush 106. This is undesirable, since when the brush direction is reversed, it usually occurs during the portion of the wash cycle where the brush 106 is to begin its movement forward across and in contact with the rear trunk of the car. To prevent the reverse torque reaction from producing this result, I have discovered that by locating the drive means 111 for the rotary horizontal brush 106 on the vertical arm 112 of the parallelogram linkage system supporting the overhead brush, the reaction torque produced upon reversal of the drive means is distributed equally through pins 118 and 125 and linearly along arms 120 and 126 to pins 128 and 130. With the force distributed along arms 120 and 126, no movement is produced which tends to move these arms, and brush 106, upward.

Side brushes 76, 78 are so disposed that, when rotated, they extend vertically from approximately 8 inches above the floor of the washing installation to approximately 38 inches above the floor. The upper extent of the side brushes is designed to correspond with the usual above-ground height of the sill portion beneath the side windows of most automobiles. It is not practical to have the side brushes extend to a greater vertical height since the bristles of the brush may tend to wrap around protruding objects such as radio antennae and detach them from the vehicle. To clean the upper vertical surfaces of the vehicle, additional, horizontally mounted opposed window brushes 158 are disposed rearwardly of side brushes 76, 78 and are pivotally supported from carriage 20 by means of window brush arms 160 for movement into and out of engagement with the vehicle to be washed. As best seen in FIGS. 1 through 4, each arm 160 is mounted on a support bracket 162 rigidly affixed to beam 58 (FIG. 4) for pivotal movement about pin 164 in a direction transverse to the direction of longitudinal movement of carriage 20. Shafts 166 supporting the bristle elements of brushes 158 are journaled for rotation about a horizontal axis at the lower ends of arms 160, and are driven by reversible hydraulic motors 168 (FIG. 2).

In the disclosed embodiment, the window brushes 158 are preferably 50 inches in diameter when the bristles are fully extended by centrifugal force, and approximately 5 inches wide. The supporting shafts 166 are located approximately 47 inches from the floor of the vehicle washing installation. As the carriage 20 moves along the vehicle from front to rear, brushes 158 rotate such that the bristles as they contact the vehicle surface are moving in an upwards direction. This prevents the bristles from becoming tangled around the radio aerial of the vehicle, which would cause the aerial to be dislodged or broken off. As the window brush moves along the vehicle, it comes into scrubbing contact with the windows and other vertical surfaces located beneath the roof and above those side surfaces cleaned by side brushes 76, 78.

Many modern automobiles have a short horizontal sill portion located just below the side window line, creating recesses which the upward moving bristles of brushes 158 do not reach during the first rearward pass of carriage 20 over the vehicle. Therefore, during the second, or rear to front, pass of carriage 20 over the vehicle, the direction of rotation of brushes 158 is reversed by reversing the operation of hydraulic motors 168. This causes the bristles of brushes 158 to contact the upper side surfaces of the vehicle in a downward direction during this second pass, whereby the bristles reach into and clean the recesses formed by the horizontal sill. As the carriage 20 moves from rear to front, the bristles of window brushes 158 lean towards the rear of the car as they contact the windows. Upon reaching the radio aerial, they are still leaning backwards, having just passed the intersection of the side or vent windows and the front windshield. By being bent in this manner, the prevented are prevented from looping over the radio aerial, and they pass harmlessly around the aerial without doing any damage thereto.

Hydraulic cylinder and piston means 170 are provided between carriage 20 and arms 160 to provide a source of power for moving window brushes 158 into and out of bearing engagement with the upper vertical surfaces of the vehicle to be washed. As best seen in FIG. 1, the window brushes 158 are so disposed that their natural pendular position brings them into contact with the upper side surfaces of the vehicle.

The present vehicle washing installation also differs from known installations of the type described in that the window brushes 158 are mounted for pivotal movement independent of the movement of the side brushes 76, 78. This enables window brushes 158 to swing inwardly to reach even the smallest automobile. This independent movement also permits all vehicles to be efficiently washed, regardless of the angle of upward slope of the windows to the roof.

Means are also provided to furnish wash and rinse liquid and wax to the surface of the vehicle as the various brushes scrub the vehicle. The liquid, besides supplying the detergent for cleaning the vehicle, also functions as a lubricant which prevents the bristles of the brushes from scratching or otherwise harming the vehicle surfaces. Wash and rinse liquid and wax is supplied to the vehicle through two inverted U-shaped pipes 172, 174 which are fastened to vertical beam members 44 and 46, and to horizontal cross beam 52 of carriage 20 (FIG. 1, 2). Each of these pipes comprises spray nozzles spacially disposed along the length thereof, through which saponated water, rinse water or a wax-water mixture is sprayed on the surfaces of the vehicle as the brushes are brought into contact with the vehicle. A first fluid vessel 176, comprising a 5 gallon plastic tank in the preferred embodiment (FIG. 1), is supported by carriage 20 and stores detergent for mixing with a supply of tap water, not shown, which is connected by flexible hoses 180 to one of the aforesaid U-shaped pipes by means of a fluid supply manifold 182 (FIG. 1). A second similar fluid vessel 178 for storing wax is supported by carriage 20 for supplying a wax solution to the manifold 182 for mixing with tap water and application to the vehicle through one of the aforesaid U-shaped pipes. Each storage vessel 176, 178 comprises a hose 184, 186 which connects each vessel with manifold 182.

It is apparent that the fluid supply system thus described is self-contained for movement with carriage 20, and only an outside source of tap water at a rate of approximately 30 gallons per vehicle need be supplied to manifold 182 through suitable flexible hosing or the like (not shown). In the disclosed apparatus, manifold 182 functions upon signals from the control means disclosed in FIG. 14 to automatically proportion the amount of saponated liquid supplied to wash arch 172 during movement of carriage 20 rearwardly over the vehicle, and to proportion the amount of rise water in pipe 174 and wax solution in pipe 172 during rear-to-front movement of carriage 20. Vessels 176 and 178 may be filled in an equipment room adjacent the washing facility, and several may be filled ahead of time for use as required.

It is also within the scope of the present invention to provide an alternate embodiment wherein saponated liquid is locally supplied to the vehicle at the point where the brushes contact the vehicle. For this purpose, one of the U-shaped pipes 172, 174 is replaced with a plurality of conduits leading directly from manifold 182 to areas adjacent brushes 76, 78, 106 and 158.

As has been previously described, movement of carriage 20 along vehicle 36, rotation of all brushes, and movement of all brushes into or out of cleaning engagement with vehicle 36 is actuated by hydraulically controlled motors or cylinder-piston power actuators. This contrasts with most known vehicle washing units which utilize air pressure to activate the various power means employed. In my system, a source of fluid pressure for operating these hydraulically powered units is provided by pump unit 188 (FIG. 1) which is driven by motor 190, which in the preferred embodiment is rated at 7 ½ horsepower. The hydraulic pump-motor unit is mounted on carriage 20 for movement therewith as carriage 20 travels along the vehicle. A suitable hydraulic control system including conduit means operably connects pump 188 with the various hydraulically operated power devices. The hydraulic control system produces a relatively high pressure, approximately 2,000 PSI, for driving carriage 20 and the rotary brush motors 94, 111 and 168, and a relatively lower pressure, approximately 175 PSI, for operating the cylinder which position the various brushes. The hydraulic system uses automatic transmission fluid, Suffix A, S.A.E. 10 motor oil, or an equivalent, which is readily available at all service stations.

In order to provide an entirely self-contained hydraulic operating system for my invention, I have provided a hydraulic fluid reservoir which is integral with the structure of carriage 20. This is best illustrated in FIGS. 12 and 13 which show vertical column member 40 of carriage 20 as a hollow, square tubular chamber 192. Ports 194 are provided to permit chamber 192 to communicate, through appropriate conduit means (not shown), with the intake and outlet ports of pump 188. A filler cap member 196 with a removable plug 198 is located near the top of column member 40 to close the upper portion of the fluid reservoir in chamber 192. By removing plug 198, additional hydraulic fluid may be added to the system, if required, as during installation of the vehicle washing unit. It will be appreciated that by locating the reservoir filler out of sight, it is substantially tamper resistant and also in an area where the least amount of moisture will be directed to the fluid in chamber 192. The air that moves in and out of chamber 192 as the oil expands and contracts due to natural heating of the system is drawn in through a filter element 198 located in chamber 192 and cap member 196. A closure plate 200 is located at the bottom of chamber 192, and a drain plug 202 is provided for use if it becomes necessary to drain the hydraulic fluid from chamber 192. The hydraulic reservoir provides a large radiant area per gallon of fluid contained, so that under normal operating conditions no coolers or extra oil capacity is required. The only maintenance necessary is a yearly change of hydraulic fluid.

By incorporating the reservoir for the hydraulic operating system in the structure of the movable carriage 20, a mobile vehicle washing unit has been constructed wherein the entire hydraulic operating system is integral, and movable with, the carriage 20. The only outside connection required is an electrical line leading to motor 190 for driving pump 188, in addition to the previously stated water source. Therefore, the present structure eliminates the need for establishing a source of hydraulic pressure in a remote area and furnishing various and cumbersome conduits to carry this pressurized fluid to the moving washing apparatus. Also, since shorter fluid conduits are used in my invention compared to remote hydraulic pressure sources, there is less drop in line pressure in the system, which results in greater operating efficiency and less cost.

An alternate embodiment of my invention provides a unit which is particularly adapted to clean taller vehicles, such as vans or other vehicles which have relatively high vertical sides. This embodiment is illustrated in FIGS. 9 and 10, and differs from the structure illustrated in FIGS. 1 through 4 by incorporating a pair of oppositely rotating horizontal window brushes 210, 212 on each side of the vehicle. While FIG. 9 only shows one such pair of window brushes, it is understood that this alternate embodiment also includes a similar pair of brushes symmetrically disposed on the other side of the van 214. Like numerals are used to indicate identical structures illustrated in FIGS. 1 through 4.

The embodiment of FIGS. 9 and 10 comprises two horizontally mounted rotatable brush elements 210, 212 supported on opposite sides of window brush arm 160, and having their central axes separated from each other by a distance slightly greater than the extended radius of one of the brushes. This prevents one brush from coming into contact with the drive means for the other brush. The drive means for each brush consists of hydraulic motors 216 and 218 driven by a suitable source of hydraulic pressure. Each hydraulic motor is connected to arm 160 and to central shafts 220 and 222 of window brushes 210 and 212 respectively. In this embodiment, the lower brush 212 rotates in a counter-clockwise direction as viewed in FIG. 9, while the upper brush 210 rotates in a clockwise direction when similarly viewed. The direction of rotation of brushes 210, 212 does not change during the rearward and frontward pass of carriage 20 along vehicle 214, so there is no need to provide reversible power units.

As seen in FIG. 9, the two counter-rotating brushes provide a means for thoroughly cleaning the vertical portions of vans and other vehicles which are higher than normal passenger automobiles. However, due to the overlap of the two brushes, a normal passenger car or sedan may also be efficiently washed by a vehicle washing unit corresponding to the alternative embodiment, whereby the upper window brush 210 will extend over and wash a portion of the roof of the vehicle. Window brushes 210 and 212 operate in tandem, and overlap portions of those areas cleaned by the top and side brushes. Brushes 210 and 212 also clean shelf areas most frequently missed by conventional units.

The electrical circuit which provides automatic control for the entire operation of the present vehicle washing apparatus is disclosed in FIG. 14. The circuit includes a rotary step switch 300 having at least fifteen successive rotative positions and a plurality of cam actuated switches SS1–SS12 which establish the program for the washing apparatus of my invention. When closed, each cam operated switch actuates an operating solenoid, which in turn, initiates a function in the wash cycle. Each rotary position of step switch 300 closes one or a plurality of cam operated switches to activate one or a plurality of operating solenoids.

Switch SS 2 controls solenoid SOL 1, which, when activated in the clsoed position of switch SS 2, transfers pressurized hydraulic fluid from pump 188 to motors 94 to rotate side brushes 76, 78 in a "rearward" direction, i.e., tending to move the brushes fron the front to the rear of vehicle 36 due to friction. When switch SS 2 is open, solenoid SOL 1 is in its deactuated position, whereby hydraulic fluid from pump 188 is transmitted through a reversing valve to motors 94 to drive side brushes 76, 78 in a "forward" direction, i.e. tending to move the brushes from the rear to the front of vehicle 36 due to friction. Switch SS 3 controls solenoid SOL 2 which, when activated, causes hydraulic fluid to flow from pump 188 to cylinders 96, 98 causing opposed side brushes 76, 78 to move laterally towards the center of the apparatus. Switch SS 4 controls solenoid SOL 3, which, when energized transmits hydraulic fluid from pump 188 to one side of cylinders 170 and 132, which moves window brushes 158 out and top brush 106 up to retract these brushes from contact with the vehicle surfaces. Switch SS 5 controls solenoid SOL 4 which, when activated, transmits hydraulic fluid from pump 188 to the opposite sides of cylinders 170 and 132, causing window brushes 158 and top brush 106 to move in and down respectively, and into contact with the vehicle surfaces.

Switch SS 6 controls solenoid SOL 5 which rotates window brushes 158, top brush 106 and moves carriage 20 from the rear to the front of the vehicle by supplying hydraulic fluid to motors 168, 111 and 32, respectively, and into contact with the vehicle surfaces.

Switch SS 7 controls solenoid SOL 6 which supplies hydraulic fluid from pump 188 to the opposite sides of motors 168, 111 and 32, causing the window brushes 158 and top brush 106 to rotate in the opposite direction, and carriage 20 to travel from the front to the rear of vehicle 36. Switch SS 8 controls solenoid SOL 7, which is disposed in washing fluid manifold 182 and functions to induce detergent into the wash water flowing to inverted U-shaped pipe 172. Switch SS 9 controls solenoid SOL 8, which is also disposed in manifold 182 and functions to induce a wax solution to flow through pipe 172 and rinse water through pipe 174. Switch SS 10 controls the transmission of electric energy to hydraulic pump motor 190, and switch SS 11 controls a "stop" light on carriage 20 which advises the driver of vehicle 36 that he has reached the proper position in the washing facility. Switch SS 12 controls a "go" light which advises the driver to advance his vehicle to start the wash cycle.

Step switch position 1 controls a reset circuit comprising reset switch PB 1 and home sensing switch 251 (FIG. 5).

The control circuit of FIG. 14 also includes rotary switch 306 which is connected ior rotation with the center shaft of step switch 300, and has 15 cam actuated switch positions RS 1 through RS 15. Step switch 300 will also have 15 positions. As will be described herein, rotary switches RS 1 through RS 15 are serially connected to the various sensing switches located throughout the washing apparatus. The combination of a closed rotary switch and a closed sensing switch will actuate stepping motor 304 and index step switch 300 forward to its next sequential position.

As illustrated in FIG. 14, rotary switch RS 1 controls sensing switch CB which is closed when the proper amount of coins are deposited in a receiving box located at the entrance to the washing facility. If desired, switch CB may be operated by a push button if the washing facility is installed in a service capacity such as in a car rental agency or car dealership. Rotary switch RS 2 controls sensing switch TD, which is closed when the vehicle 36 moves forward from the coin box or push button and alights on a treadle placed ahead of the washing facility to indicate that vehicle 36 has been properly positioned. Rotary switches RS 4 and RS 9, connected in parallel, control sensing switch 232 (FIG. 6), which is responsive to the tilt of side brushes 76, 78 in a longitudinal direction, that is, the direction in which the carriage 20 moves rearwardly and forwardly over tracks 22. Rotary switches RS 3 and RS 12, also connected in parallel, control switches 242(a) and (c) — one located on the passenger side and the other located on the driver side of carriage 20 — (FIG. 6) which are closed when side brushes 76, 78 have moved towards each other near the center line of carriage 20.

Rotary switches RS 6, RS 11, and RS 14 are connected in parallel and control switches 242(b) and (d), which close when side brushes 76, 78 are in a retracted or "out" position. Rotary switch RS 7 controls switch 250 (FIG. 8) which is closed when top brush 106 is in a "down" position below its uppermost limit of vertical travel. Rotary switch RS 7 and switch 250 are connected in series with the "side brush in" switches 242(a) and (c) for a purpose to be explained. Rotary switch RS 15 controls "home" sensing means 251 (FIG. 5), while rotary switches RS 8, RS 10, RS 13 and RS 5 are connected in parallel to time delay relay switch TR. It is apparent that the sensing switches will not activate stepping motor 304 to rotate step switch 300 to initiate a new series of functions upon the completion of each phase of the wash cycle unless the proper rotary switch is closed, allowing the sensing switch to complete the circuit to solenoid 304. The rotary switch, therefore, functions as a sequencing means which ensures that each following series of functions is properly performed in the proper order.

Other elements of the electrical control circuit of my invention include an entrance switch 308, a circuit breaker 310, and a transformer 312 to reduce the incoming 220/440 voltage to approximately 24 volts for all internal control lines. Motor 190 is shown as a three-phase motor connected to the 220/440 volt line ahead of transformer 312. By providing solenoid valves for the hydraulic wash fluid circuits which operate on 24 volts, my invention provides a degree of safety not found in many competitive units.

The operation of the rollover vehicle washing apparatus which is the subject of my present invention involves the application of several novel features not found in known vehicle washing units. These features will be best understood by referring to the following description of the operation of the embodiment of my invention which comprises the five-brush unit illustrated in FIGS. 1 through 4. The sequence of operations in a complete wash cycle is demonstrated by the chart of FIG. 15.

The vehicle to be washed is driven into place with its forward end facing the front of the car wash assembly and carriage 20, which is in its "home" or off position ahead of the vehicle after having completed the previous wash cycle. The front of the unit is the side facing left in FIG. 2. At this point, all switches controlled by step switch 300 are open. Sensing switch 251 (FIG. 5) is closed, and rotary switch RS 1 is closed, activating the coin box switch CB circuit for sequential operation. A coin box containing switch CB is located in the washing installation adjacent the window on the driver's side of the vehicle as he approaches the washing unit. By placing the proper amount of coins in the box, the driver closes switch CB, which completes the electrical circuit through rotary switch RS 1 and energizes stepping motor 304, thereby indexing step switch 300 one position forward. In this position of step switch 300, reset circuit switch SS 1 (FIG. 14) is closed, and it remains closed until the side brushes 76, 78 swing outward to their retracted position at the end of the wash cycle, as will be explained. Step switch SS 12 also closes, turning on green light G which advises the driver to advance his vehicle forward towards carriage 20. Rotary switch 306 is also indexed one step forward by stepping motor 304, closing switch RS 2 and thereby activating the treadle switch TD circuit for sequential operation.

As the driver moves the vehicle forward, a front wheel depresses a treadle (not shown) which closes treadle switch TD, completing the circuit through rotary switch RS 2, energizing stepping motor 304, and advancing step switch 306 to its next position. In this condition of the step switch, switches SS 3, SS 4, SS 7, SS 10 and SS 11 are closed. Switch SS 3 activates solenoid SOL 2, which permits hydraulic fluid to pass from pump 188 to cylinders 96, 98 as switch SS 10 activates hydraulic pump motor 190. The hydraulic fluid transmitted to cylinders 96, 98 causes side brushes 76, 78 to move laterally toward each other, while at the same time, fluid supplied to motors 94 rotates side brushes 76, 78 in a "forward" direction. Switch SS 4 energizes solenoid SOL 3, which causes hydraulic fluid to flow from pump 188 to cylinders 132, 170, causing top brush 106 to be lifted vertically upward, and window brushes 158 to be retracted outwardly. Switch SS 7 energizes solenoid SOL 6, causing detergent to mix with the water flowing through manifold 182 and into pipe 172 (FIG 1). Also, switch SS 11 energizes red "stop" light R, which indicates to the driver that he should advance his vehicle no further. At this point, green "go" light G switch SS 12 has been disconnected. As step switch 300 was previously advanced upon actuation of treadle switch TD, rotary switch 306 was also indexed one position forward by stepping motor 304, closing rotary switch RS 3 and thereby activating "side brush in" circuit switches 242(a) and 242(c) for sequential operation. Switches SS 10 and SS 11 remained closed during the complete wash cycle to provide a constant source of fluid pressure from pump 188, and to keep the red "stop" light R lit.

In FIG. 7, side brush arms 84 and 86 are illustrated in their full downward position (a), and in phantom in their full outward position (b) wherein the brushes 76, 78 are extended away from contact with the vehicle; and in the wash position (c) which is the position the arms obtain when the brushes 76, 78 are in engagement with the side vertical surfaces of the vehicle. Each of the side brush arms 84, 86 comprises cam members 236 and 236 which, upon movement of arms 84 and 86, activate switch operating lever 240 which is connected to switch 242. Switch 242 is a multi-position switch, duplicated on both the left and right sides of the machine wherein contacts 242(a) on the left side and 242(c) on the right side (FIG. 14) are closed when side brush arms 84, 86 are inwardly disposed in position (a) of FIG. 7, and contacts 242(b) on the left side and 242(d) on the right side are closed when the side brush arms are in position (b) of FIG. 7.

As side brushes 76, 78 move towards each other under the influence of cylinders 96, 98 in a direction transverse to the direction of travel to carriage 20, switches 242(a) (driver's side) and 242(c) (passenger side) are closed, completing a circuit through rotary switch RS 3, energizing solenoid 304 and advancing step switch 300 one step forward. In this position, step switches SS 3, SS 4, SS 7, SS 10 and SS 11 remain closed, thereby retaining side brushes 76, 78 in a central position and disposed toward each other ahead of the vehicle 36. Also, over-head brush 106 and window brushes 158 remain retracted, and a detergent solution continues to flow through pipe 172. With the closing of switch SS 7, solenoid SOL 6 is energized, which transmits hydraulic fluid from pump 188 to motors 111 and 168, thereby rotating top brush 106 and side brushes 158 in a "forward" direction while these brushes are retained in a retracted position. Fluid from pump 188 is also transmitted via solenoid SOL 6 to motors 32, which drives wheels 24 and causes carriage 20 to move rearwardly and towards the front of vehicle 36. By the rotation of step switch 300, rotary switch 306 was also indexed one position forward, closing rotary switch RS 4 and thereby activating "side brush tilt" circuit switch 232 for sequential operation.

As carriage 20 travels rearwardly and reaches vehicle 36, side brushes 76, 78 contact the front of the vehicle and tilt forwardly, or in a direction opposite to the direction of movement of carriage 20. Referring to FIG. 6, arms 84, 86 and bracket 80 tilt about pivot pins 82, and brushes 76 and 78 move forward in a direction parallel to the direction of movement of carriage 20. A flanged extension 220 is affixe for pivotal rotation with bracket 80. A switch cam bracket member 222 is attached for movement with flange 220. Adjustable switch cams 224 are held by bracket 222, and each cam member is designed to engage follower 226 attached to switch lever operator 228. Switch lever operator 228 is in turn affixed to switch operator 230 inside of switch 232. As the bracket 80 pivots about pins 82, flange 220 and bracket 222 move upward or downward, and cam members 224 engage follower 226 to move lever 228 upwards or downwards.

The tilting movement of the side brushes, therefore, closes switch 232 (FIG. 6), completing a circuit through rotary switch RS 4, energizing step motor 304 and advancing step switch 300 one position forward. In this mode, step switches SS 3 and SS 4 remain closed, retaining the side brushes 76, 78 in their inward position adjacent each other while the window and top brushes remain retracted. Switch SS 8 and solenoid SOL 7 remain closed, permitting detergent to mix with the water flowing through pipe 172. Step switch SS 2 is also closed, causing solenoid SOL 1 to reverse the flow of hydraulic fluid through motors 94, thereby reversing the direction of rotation of side brushes 76, 78. The side brushes now rotate in a "rearward" direction, that is, the frictional engagement of the brushes with the vehicle tends to move the brushes 76, 78 towards the outer sides and rear of the vehicle. In this position of step switch 300, switch SS 7 is opened, thereby interrupting the flow of electrical current to solenoid SOL 6, which in turn shuts off the supply of hydraulic fluid to motors 32 and stops the rearward movement of carriage 20 adjacent the front of vehicle 36. Therefore, it is apparent that the carriage 20 of the present invention is stopped by means responsive to physically sensing the position of the front end of vehicle 36.

In this above-identified position, step switch 300 has moved rotary switch 306 one position forward so that switch RS 5 is closed, which is connected in series with time delay switch TR. After the termination of an adjustable time delay period, switch TR closes, and stepping motor 304 is activated, advancing step switch 300 another position forward. Switches SS 2, SS 4, and SS 8 remain closed, whereby side brushes 76, 78 continue to rotate "rearwardly" while the window and side brushes remain retracted and detergent continues to mix with the water in pipe 172. In this position of step switch 300, switch SS 3 is opened and solenoid SOL 2 is de-energized, whereby hydraulic fluid flows to the opposite or piston rod sides of cylinders 96, 98 causing side brushes 76, 78 to move laterally away from each other and across the front of vehicle 36. With carriage 20 in a stationary position, the side brushes clean the grille, front bumper and lights as saponated liquid is dispensed through the spray nozzles located along pipe 172. Further, step switch 300 has also moved rotary switch one position forward whereby switch RS 6 is now closed, sequencing " side brush out" switches 242(b) and 242(d) for operation.

When the side brushes 76, 78 reach approximately the full outward limit of their travel, "side brush out" switches 242(b) and 242(d) are closed, and a circuit is completed through switch RS 6 to stepping motor 304, which is energized and advances step switch 300 one step forward. Switches SS 2 and SS 8 remain closed, whereby side brushes 76, 78 continue to rotate rearwardly and saponated liquid continues to flow through pipe 174. Switch SS 4 is opened, de-energizing solenoid SOL 4 which transmits hydraulic fluid to the piston side of cylinders 170 and 132, which in turn moves window brushes 158 inward and moves top brush 106 downward into contact with vehicle 36. Simultaneously, switch SS 7 is closed energizing solenoid SOL 6 which causes hydraulic fluid to flow to motors 168, 111, and 32, rotating side brushes 158, top brush 106, and continuing rearward movement of carriage 20 along vehicle 36. As carriage 20 moves rearwardly, all brushes rotate and are in contact with the vehicle. Top brush 106 first lowers to the top of the grille, and then moves across the hood, roof and trunk deck of the vehicle. Saponated liquid issues from pipe 172 and is deposited on vehicle 36, and acts as a cleansing agent and lubricant, whereby the rotating brushes clean the vehicle as they come into contact with the vehicle surfaces. The side brushes 76, 78 wash the vertical surfaces of the vehicle below the window sill line, while the horizontally mounted window brushes 158 clean the vertical portions of the vehicle between the lower window sill and the roof of the vehicle. Step switch 300 has also positioned rotary switch 306 into position to close switch RS 7.

Means are provided for indicating whether the overhead brush has remained on the roof of the vehicle, or whether it has lowered to come into contact with the rear trunk deck of the vehicle. As shown in FIG. 8, a switch 250 is attached to beam member 119, and includes a cam follower operator 252 which engages cam 254. Cam 254 is in turn rigidly attached to shaft 121 which rotates as horizontal brush 106 moves upward and downward in substantially a vertical direction. Switch 250 is a two position switch and assumes an open position when the overhead brush 106 is raised or is in scrubbing contact with the roof of the vehicle to be washed. The switch 250 assumes a closed position when the brush 106 lowers to a point below the upper limit of its vertical disposition, and in particularly reaches a closed position when overhead brush 106 is in scrubbing contact with the hood or the rear trunk deck of the vehicle to be washed.

When carriage 20 advances rearwardly to a point somewhat adjacent the rear of vehicle 36, side brushes 76, 78 due to the force of gravity acting upon the weight of the side brushes and their suspension systems, sense the end of the vehicle by moving inward in a direction transverse to the direction of movement of carriage 20. This inward movement of brushes 76, 78 closes switches 242(a) and 242 (c). Assuming vehicle 36 is a sedan, top brush 106, has passed from the roof of the vehicle and now is in a lower position in contact with the trunk lid of the vehicle. In lowered position, top brush 106 has closed switch 250 (FIG. 8), which is closed when side brushes 76, 78 sense the end of vehicle 36. Referring to FIG. 14, it will be appreciated that switches RS 7, 250, 242(a) and 242(c) are connected in series to solenoid 304. Therefore, when side brushes 76, 78 sense the end of the sedan, all four serially connected switches are closed, and step switch 300 is advanced one position by stepping motor 304.

In this position of step switch 300, switch SS 2 remains closed, maintaining the rearward rotation of side brushes 76, 78. Switch SS 8 also remains closed, providing cleansing liquid to the vehicle through pipe 172. Switches SS 3 and 4 are closed, energizing solenoids SOL 2 and SOL 3. Solenoid SOL 2 permits hydraulic fluid to be applied at the piston side of cylinders 96, 98, thereby moving side brushes 76, 78 inwardly towards each other and in contact with the vehicle. Switch SS 7 is opened, whereby solenoid SOL 6 is de-energized. This causes window brushes 158 and top brush 106 to stop rotating as they are retracted, and also causes carriage 20 to stop adjacent the rear of the vehicle. This is an important feature of the present invention, whereby side brushes 76, 78 are used to "sense" the rear of the vehicle and to halt the rearward movement of carriage 20. By preventing the continued movement of the carriage beyond the vehicle, a saving in time and resources is accomplished, to wit: there is no time lost in advancing the carriage behind the vehicle, and cleansing liquid is not dispensed on the floor of the washing facility behind the vehicle. Also, my invention is able to stop carriage 20 at the rear of any size vehicle, since it is the physical position of the rear of the vehicle which determines where carriage 20 stops its rearward travel.

If vehicle 36 is a station wagon or van to be washed, top brush 106 remains on the roof of the vehicle as carriage 20 travels rearwardly. When side brushes 76, 78 sense the rear of the car and move in, closing switches 242(a) and 242(c), switch 250 remains open. This prevents the energization of stepping motor 304, and advancement of the step switch 300 to a position where carriage 20 is stopped. The circuitry for advancing the step switch to this position and stopping carriage 20 is not actuated until top brush 106 drops from the roof of the vehicle to a lower position thereby closing switch 250, which is connected in series with switches 242(a) and 242(c). Therefore, the carriage 20 continues a short distance beyond the rear of the station wagon or van, until the top brush falls off the roof and comes in contact with the rear vertical surface of the vehicle, closing switch 250 and activating the step switch circuit through stepping motor 304. As brush 106 drops across the rear of the vehicle, it cleans the rear window of the station wagon or van before the carriage stops.

After the step switch 300 has been rotated through the above position whereby rearward movement of carriage 20 is stopped, rotary switch RS 8 is closed thereby energizing the time relay switch TR and step switch SS 3 is closed causing the side brushes 76, 78 to move inwardly towards each other cleaning the rear of the vehicle. At the termination of an adjustable time delay period, step switch 300 is advanced one position forward whereby switches SS 2, SS 3 and SS 4 remain closed, and side brushes 76, 78 continue to rotate to the rear. Also, step switch SS 6 is closed, energizing solenoid SOL 5 which supplies hydraulic fluid to motors 168, 111 and 32, to rotate the window brushes 158 and top brush 106 in a reverse or "forward" direction, i.e., towards the front of the vehicle. Also, step switch SS 8 is opened, thereby preventing the energization of solenoid SOL 7 and halting the introduction of detergent into pipe 172. At the same time, switch SS 9 is closed, energizing solenoid SOL 8 which is located in manifold 182, causing a wax solution to be introduced into the fluid passing through pipe 172, while rinse water without any additives is being supplied through pipe 174. The dwell time between the completion of the time relay function and the time carriage 20 starts its part of the washing cycle provides ample time to purge the detergent from pipe 172 prior to the application of wax. Rotary switch RS 9 has also been moved to a closed position by the actuation of step switch 300 to the presently described location.

As carriage 20 moves in a forward direction, side brushes 76, 78 which are disposed toward each other near the center of the vehicle, tilt rearwardly upon contact with the vehicle 36. This rearward motion of side brushes 76, 78 closes switch 232 which is connected in series with closed rotary switch RS 9, thereby energizing stepping motor 304 and advancing step switch 300 to its next forward position. At this point, step switch SS 2 is opened, thereby de-energizing solenoid SOL 1. This causes the reversal of hydraulic fluid flow to motors 94, thereby reversing the rotation of the side brushes 76, 78 which now rotate in a "forward" direction. Also, in this position of step switch 300, step switch SS 6 is opened de-energizing solenoid SOL 5, which interrupts the flow of hydraulic fluid to motors 32 and halts the forward motion of carriage 20. As previously described, a wax solution and rinse water continues to be applied to the vehicle through pipes 172 and 174. Also, in this position, the step switch has indexed the rotatary switch to positions RS 10, which switch is now closed.

Switch RS 10 activates time delay switch TR which at the end of an adjustable time delay period indexes step switch 300 to its next forward position. In this position, step switch SS 3 is opened de-energizing solenoid SOL 2, thereby interrupting the flow of hydraulic fluid to the piston side of cylinders 96 and 98. This causes side brushes 76, 78 to retract outwardly across the rear of the vehicle, cleaning the vehicle as it comes into contact therewith. Step switch SS 4 remains closed, whereby the window brushes 158 and top brush 106 are retained in their retracted positions. Rotary switch 306 has been indexed to a position whereby switch RS 11 is now closed.

When side brushes 76, 78 have reached the extent of their outward travel, switches 242(b) and 242(d) are closed, which in conjunction with the closing of rotary switch RS 11, energizes stepping motor 304 and advances step switch 300 to its next sequential position. In this position, step switch SS 4 is open, deenergizing solenoid SOL 3 while step switch SS 5 is closed, energizing solenoid SOL 4 which causes hydraulic fluid to be transmitted from pump 188 to the piston side of cylinders 170 and 132. This causes window brushes 158 to move inwardly towards each other and top brush 106 downward such that the side brushes and overhead brush come into brushing contact with the vehicle. Also, step switch SS 6 is closed, energizing solenoid SOL 5 which causes hydraulic fluid to flow to motors 168, 111 and 32 whereby the window brushes and top brush are rotated in forward direction, and carriage 20 commences movement towards the front of the vehicle along tracks 22. Switch SS 9 remains closed, energizing solenoid SOL 8 whereby a wax solution is dispensed to the surfaces of the vehicle through pipe 172 while rinse water is simultaneously applied through pipe 174. At this point, rotary switch RS 12 has been closed by the indexing of rotary switch 306.

Carriage 20 continues its forward movement along the vehicle with all brushes in contact with, and cleaning the vehicle as the brushes come into contact therewith. By operating in the opposite direction on the return trip, overhead brush 106 is able to reach partly unaccessible areas at the front and rear of the vehicle. Carriage 20 continues its forward movement until side brushes 76, 78 reach the forward limits of the vehicle and move inwardly under the force of gravity. As side brushes 76, 78 move inwardly at the front of the vehicle, switches 242(a) and 243(c) are again closed. An electrical circuit is then completed through switches RS 12, 242(i a) and 242(c) to energize stepping motor 304 and advance step switch 300 to its next sequential position. Step switch SS 3 is now closed, energizing solenoid SOL 2 which causes hydraulic fluid to be transmitted to the piston side of cyoinders 96, 98 whereby side brushes 76, 78 are moved inwardly towards each other across the grille of the vehicle. Also, step switch SS 4 is closed energizing solenoid SOL 3 which causes hydraulic fluid to be transmitted to the piston rod side of cylinders 132 and 170, whereby side brushes 158 and top brush 106 are again retracted from the surfaces of the vehicle. Further, step switch SS 6 is open, de-energizing solenoid SOL 5 which interrupts the flow of hydraulic fluid to motors 168, 111 and 32, thereby halting the rotation of side brushes 158 and top brush 106, and also stopping the forward movement of carriage 20. As side brushes 76, 78 move across the front and grille of the vehicle, a wax solution and rinse water continues to be applied to the vehicle through pipes 172 and 174. Step switch 300 has also moved rotary switch 306 into position to close switch RS 13.

Switch RS 13 is connected in series with time delay switch TR, which after an adjustable time delay period, closes and energizes stepping motor 304, rotating step switch 300 into its next forward position. The time delay period is established such that stepping motor 304 is energized when the side brushes have reached the limit of their travel inwardly towards each other. In this position of step switch 300, switch SS 2 is closed, energizing solenoid SOL 1, which reverses the flow of hydraulic fluid to motors 94, thereby reversing the rotation of side brushes 76, 78. Switch SS 3 is opened, de-energizing solenoid SOL 2. This removes the application of hydraulic fluid to the piston side of cylinders 96, 98, causing side brushes 76, 78, to move outwardly. Switch SS 4 remains closed, retaining the energization of solenoid SOL 3, whereby the window brushes 158 and top brush 106 are maintained in a retracted position. Rotary switch 306 is indexed to a position whereby switch RS 14 is now closed.

As the side brushes 76, 78 move outwardly, switches 242(b) and 242(d) are eventually closed, creating a circuit through rotary switch RS 14, energizing stepping motor 304, and advancing step switch 300 to its next sequential position. In this position of step switch 300, switches SS 2 and 4 remain closed, energizing solenoids SOL 1 and SOL 3, whereby the side brushes 76, 78 continue to rotate rearwardly, while the window brushes 158 and top brush 106 remain in a retracted position. Step switch SS 6 is now closed, energizing solenoid SOL 5 which transmits hydraulic fluid to motors 32 causing carriage 20 to resume its motion in a forward direction away from the front of the vehicle. Also, in this position of the step switch 300, rotary switch RS 15 is closed.

Referring to FIG. 5, it will be seen that when carriage 20 reaches a position at the end of track 22, wand 253 contacts angle plate 255, thereby closing switch 251. Referring to FIG. 14, it will be be appreciated that the closing of switch 251 completes a circuit through RS 15 which energizes stepping motor 304 and advances step switch 300 to its next sequential position. Switches SS 2 and 4 remain closed, continuing the rotation of side brushes 76, 78 in a rearward direction while maintaining the window brushes 158 and top brush 106 in their retracted position. Step switch SS 6 is now opened, thereby de-activating solenoid SOL 5 and interrupting the flow of fluid to motors 32, halting movement of carriage 20 in a forward direction. Further, step switch SS 9 is now opened, de-energizing solenoid SOL 8 and interrupting the flow of the wax solution and rinse water through pipes 172 and 174.

After the wash cycle has been completed, all brushes are in their retracted positions, providing enough clearance for passage of the vehicle forward through the washing apparatus which may be located in a drive-through service bay. The time delay switches of the disclosed apparatus are adjustable to permit a complete wash cycle as described in a time of 1½ to 1¾ minutes per vehicle.

Therefore, it will be appreciated that the vehicle washing apparatus which is the subject of the present invention incorporates a means to sense the position of the carriage 20 relative to the vehicle by "feeling" the vehicle with the side brushes 76 and 78. As a result, the movement of the carriage 20 is constantly altered depending upon the length of the vehicle to be washed. It is apparent that small vehicles as well as large vehicles may equally be washed efficiently by the present apparatus without excessive movement of the carriage 20, or wasteful deposits of soap and water on the floor of the installation. Also, by insuring that the top brush 106 is no longer on the roof of the vehicle before rearward travel of the carriage 20 is stopped, the present invention provides a downward stroke of the overhead brush 106 against the rear windows of station wagons and vans. This downward stroke insures that these windows are properly washed.

The above described electrical and hydraulic control circuit may be applied to a seven-brush unit corresponding to the present invention, whereby the window brushes comprise two counter-rotating, offset, vertically disposed brushes. In such instances, the electrical and hydraulic circuit may be slightly modified due to the fact that the side brushes in the seven-brush unit do not reverse rotation when the carriage 20 has reached the end of the vehicle after the first pass.

Figure 18:
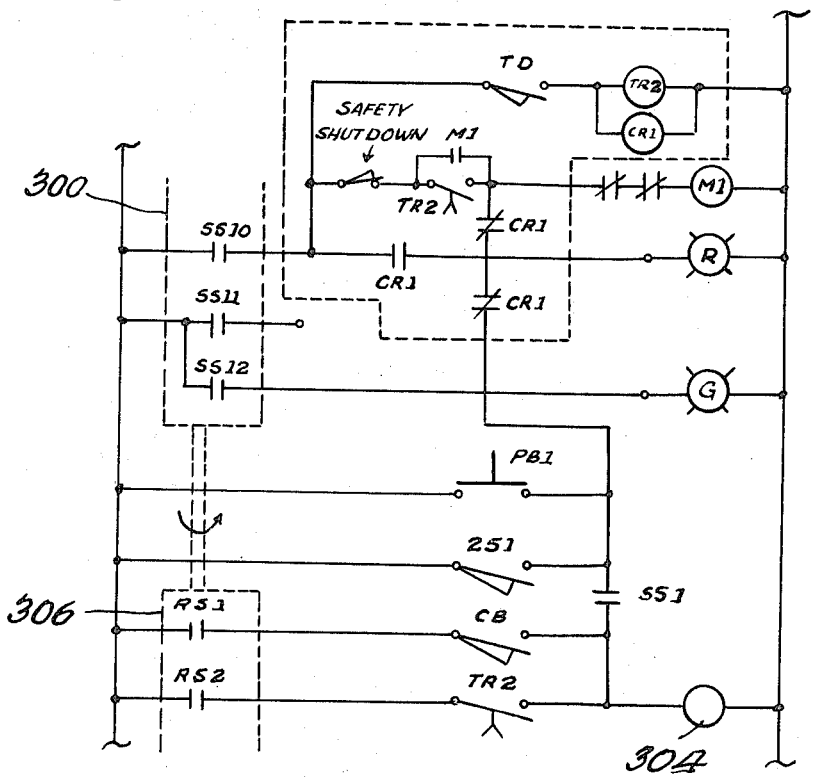
FIG. 18 is a modified form of the electrical control circuit of FIG. 14.

Referring to FIG 18, a modified electrical control circuit utilizing a treadle-delay safety circuit can be utilized in the present invention. The treadle-delay safety circuit provides additional protection of the vehicle washing apparatus and the vehicle being washed by delaying start of the washing cycle until the vehicle has been properly placed on the treadle switch TD for a given period of time established by the time setting of time delay relay TR 2. Thus, a momentary closing of the treadle switch TD followed by a movement off the switch TD will not initiate a wash cycle. In the absence of the treadle-delay and safety circuit when the vehicle being washed is driven forward after momentary closing of the treadle switch TD, damage to the vehicle and the washing apparatus could result.

Further protection is afforded by the treadle-delay safety circuit if the vehicle being washed moves off the treadle switch TD during the wash cycle before the cyle is completed. In this circumstance the treadle-delay safety circuit is activated and the stepping motor 304 rapidly steps through to position RS 15 causing all brushes in the washing apparatus to retract and returning the vehicle washing apparatus to the home position. The treadle-delay safety circuit, thus provides protection against damage and also returns the vehicle washing apparatus to the home position in the control sequence so that the washing apparatus can be reactivated without requiring manual resetting. This is of particular importance where the washing apparatus is operated without an attendant and is started by the user activating a coin box or push button.

The treadle-delay safety circuit is placed in the electrical control circuit shown in FIG. 4 by inserting the treadle-delay circuit between switch SS 10 and motor starter relay M 1. A connection is also made from the treadle-dealy safety circuit to the "stop" light, which is disconnected from switch SS 11. An output from the treadle-delay circuit is connected to the reset safety circuit controlled by switch SS 1 in the same manner as are push button switch PB 1 and home switch 251. Treadle switch TD is inserted in the treadle-delay circuit and is replaced in the circuit of FIG. 14 by normally open contacts of time delay relay TR 2 contained in the treadle-delay circuit.

As previously described, the wash cycle is initiated by either placing coins in a coin box and closing switch CB or by pressing a start button. This causes the stepping motor 304 to advance the rotary step switch 306 one step, thereby closing switch RS 2 wwhich is in series with the normally open contacts of time delay relay TR 2. In this condition, the stepping motor 304 will advance the rotary step switch 306 only after time delay TR 2 completes the time delay action and closes the normally open contacts thereof.

The treadle-delay safety circuit is activated through switch SS 10 which is closed in the second rotary step switch position RS 2 as indicated in the sequence chart of FIG. 15. when the switch SS 10 and the treadle switch TD are closed by properly positioning the vehicle to be washed, the time delay relay TR 2 is activated and begins the timing period. At the same time control relay CR 1, which is connected in parallel with time delay relay TR 2, is activated and immediately transfers contacts, thereby turning on the stop light R and disconnecting the closed switch SS 10 from the stepping motor 304. In the previously described electrical control circuit shown in FIG. 14, momentary closing of the treadle switch TD will initiate the wash cycle.

When the timing cycle of time delay relay TR 2 is completed, the contacts of time delay relay TR 2 transfer completing the circuit from closed switch RS 2 to the stepping motor 304 and advancing the stepping motor one step to position RS 3. At the same time the contacts of time delay TR 2 which are in series with the motor starter relay M 1 of pump motor 190 are closed thereby causing starter relay M 1 to transfer contacts and start the hydraulic pump motor 190. When the motor starter relay M 1 is activated, the normally open contacts of the motor starter relay M 1, close a circuit around the contacts of time delay relay TR 2 in series with motor starter relay M 1.

The washing cycle then proceeds normally to completion, unless during the wash cycle, the vehicle being washed is moved from the treadle switch TD. In such case, the circuit from switch SS 10 to time delay relay TR 2 and control relay CR 1 will be opened by treadle switch TD, thereby causing immediate transfer of the contacts of relays TR 2 and CR 1. Time delay relay TR 2 is an "on delay" type of unit which delays transfer of contacts only when current is initially applied and thus transfers immediately when turned off. The transfer of the contacts of time delay relay TR 2, which are in series with switch RS 2, does not affect the operation of the cicuit since the switch RS 2 is open after advance beyond the second step position and the contacts of relay TR 2 in series with motor starter relay M 1 are bypassed by the normally open contacts of motor starter relay M 1 which are held closed. However, the transfer to an off condition of control relay CR 1 activates the safety reset circuit by closing the circuit from switch SS 10 through the normally open contacts of relay M 1 which are held closed, through the two normally closed contacts from control relay CR 1, through switch SS 1 to the stepping motor 304. This causes the stepping motor 304 to index continuously until the home position is reached. The red "stop" light remains on until the machine reaches the home position, at which time the stepping motor has advanced the rotary switch 306 to position RS 1 which causes switch SS 10 to open thereby breaking the circuit to both the motor starter relay M 1 and the stop light.

Figure 16:
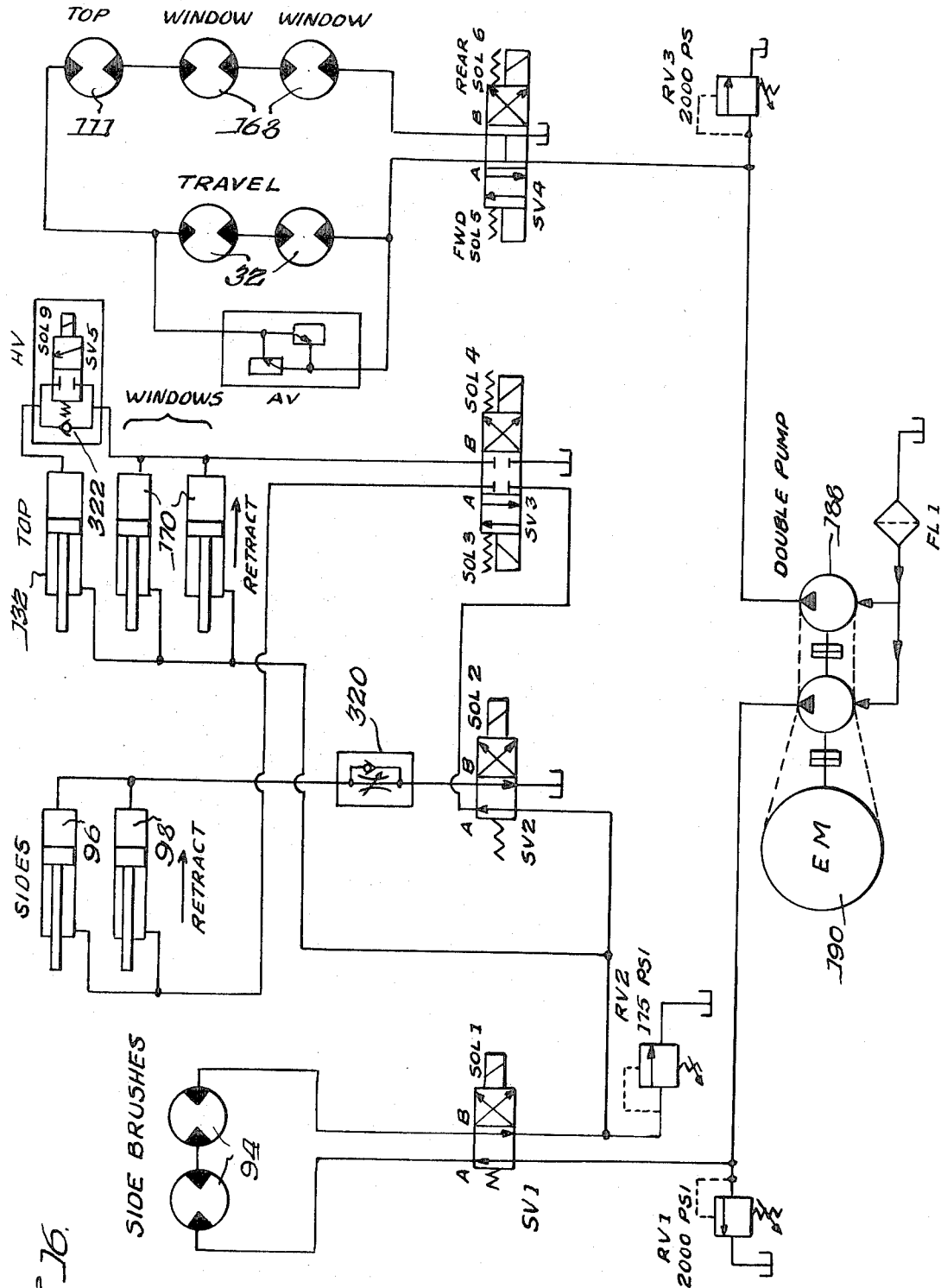
FIG. 16 is a schematic, hydraulic diagram of a hydraulic control circuit for practicing the present invention.

Referring to FIG. 16, the electric motor 190 drives the double hydraulic pump 188 to produce a source of pressurized hydraulic fluid of approximately 500 to 1,500 PSI. The double pump 188 draws hydraulic fluid through filter FL 1 from the hydraulic reservoir. The double pump 188 is connected to relief valves RV 1 and RV 3 which are set to maintain a 2,000 PSI limit on the pressure of hydraulic fluid from the double pump 188 and thereby provide safety protection for the hydraulic system. Solenoid valve SV 1 is controlled by solenoid SOL 1 and directs hydraulic fluid from one side of double pump 188 to drive the reversible hydraulic motors 94 which rotate the side brushes 76 and 78.

The return line from the side motors 94 directs fluid flow through solenoid valve SV 1 to relief valve RV 2 which is set to limit the return pressure to approximately 175 PSI. The relief valve RV 2 provides a low pressure hydraulic fluid source of approximately 175 PSI for driving the hydraulic cylinders which position the top, side and window brushes in the vehicle washing apparatus.

In particular, the low pressure source is directly connected to the piston rod side of hydraulic cylinder 132 which positions the top brush 106 and hydraulic cylinders 170 which position the window brushes 158. The low pressure source is also coupled through solenoid valve SV 2 to solenoid valve SV 3. The A port of solenoid valve SV 3 is coupled to the piston rod side of side brush cylinders 96 and 98 and the B port of solenoid valve SV 3 is coupled to the piston side of window brush cylinders 170 and through top brush holding valve HV to the piston port side of top-brush cylinder 132. The solenoid valve SV 2 also is connected to the piston side of side brush cylinders 96 and 98.

The solenoid valve SV 1 has two functions and produces straight-through flow in the normal position when solenoid SOL 1 is de-energized and produces reverse fluid flow when the solenoid SOL 1 is energized. The solenoid valve SV 2 is controlled by solenoid SOL 2 and provides the same two functions as solenoid valve SV 1.

Solenoid valve SV 3 is a three-function valve and is controlled by solenoids SOL 3 and SOL 4. In the normal position when solenoids SOL 3 and SOL 4 are de-energized, solenoid valve SV 3 blocks fluid flow. Energizing solenoid SOL 3 produces straight-through fluid flow in solenoid valve SV 3 while energizing SOL 4 produces reverse fluid flow.

Solenoid valve SV 4 is a three-function valve which is connected to the high pressure source of hydraulic fluid provided by one side of double pump 188 and is controlled by solenoids SOL 5 and SOL 6. Solenoid valve SV 4 directs high pressure fluid to the reversible hydraulic travel motors 32, the reversible hydraulic motor 111 which rotates the top brush 106, and the reversible hydraulic motors 168 which rotate the window brushes 158. In the normal position when solenoids SOL 5 and SOL 6 are de-enegized, solenoid valve SV 4 returns hydraulic fluid to the hydraulic reservoir. Energizing solenoid SOL 5 produces straight-through flow to drive the motors 32, 111 and 168 in the forward direction while energizing SOL 6 produces reverse fluid flow to drive the motors 32, 111 and 168 in the rearward direction.

An acceleration valve AV, which comprises two pressure relief valves, is connected in parallel around the travel motors 32 to serve as a by-pass for limiting the pressure of the hydraulic fluid applied to the travel motors 32 during starting. The limiting of fluid pressure during starting prevents the full hydraulic pressure generated by pump 188 from being applied to motors 32 during starting and thus limits the torque generated by motors 32 during starting to an acceptable value. This prevents jerking of the vehicle washing apparatus upon starting of the travel motors 32.

A one-way restrictor valve 320 limits return flow from the piston side of side brush cylinders 96 and 98 during the retraction of the side brushes while permitting free flow of fluid from solenoid valve SV 2 to the side-brush cylinders 96 and 98 during extension of the side brushes. This prevents too rapid a movement of the side brushes 76 and 78 during retraction by the side brush cylinders 96 and 98, especially when the side brushes are being retracted across the front end of a vehicle in the washing cycle.

The top brush holding valve HV includes a solenoid valve SV 5 which is connected in parallel with a ball check valve 322. Fluid flowing from the piston side of top brush cylinder 132 is coupled through the check valve 322 to solenoid valve SV 3 while fluid traveling from solenoid valve SV 3 is coupled through solenoid valve SV 5 to the piston side of top brush cylinder 132. Solenoid valve SV 5 is a two function valve which normally blocks fluid flow and upon energizing of solenoid SOL 9 permits fluid flow. When solenoid SOL 9 is energized, the top brush holding valve HV permits fluid flow both to and from the piston side of top brush cylinder 132 to allow both retracting and extension of top brush 106. However, when the solenoid SOL 9 is de-energized, solenoid valve SV 5 blocks fluid flow to the piston side of cylinder 132 thereby preventing extending or lowering of the top brush 106 but the check valve 322 permits fluid flow from the piston side cylinder 132 to solenoid valve SV 3 to allow further retraction or raising of top brush 106.

The top brush holding valve HV operates as a fail safe device to prevent lowering of the top brush 106 in the case of power failure, since flow to the piston side of the top brush cylinder 132 is blocked when the solenoid SOL 9 is de-energized. However, the top brush 106 can be raised to a higher lever when the power has failed in the washing apparatus, since the check valve 322 permits fluid flow from the piston side of the top brush to cylinder 132. Also, the top brush holding valve HV can be utilized to keep the top brush 106 from lowering after passing over the cab of a vehicle having a vertical surface of significant height such as a pick-up truck. This prevents the top brush 106 from colliding with the vertical back surface of the pick-up cab when traveling from the rear to the front of the vehicle in the washing cycle.

The operation of the hydraulic control system begins when the electric motor 190 is turned on and the double pump 188 generates hydraulic fluid pressure. Fluid flows from the double pump 188 through solenoid valve SV 1 and drives the side brush motors 94 to rotate the side brushes. The return fluid from the motors 94 passes through solenoid valve SV 1 to relief valve RV 2 which generates the low-pressure fluid source of approximately 175 PSI. Energizing solenoid SOL 1 reverses the direction of rotation of the side brush motors 94.

Fluid also flows from double pump 188 through solenoid valve SV 4 and returns to the hydraulic reservoir. However, energizing solenoid SOL 5 drives the travel motors 32, top brush motor 111 and window brush motors 168 in a forward direction. Energizing solenoid SOL 6 reverses the fluid flow and drives the motors 32, 111 and 168 in a rearward direction.

The top brush motor 111, as well as the travel motors 32 and window brush motors 168, operate only when one of the control solenoids for solenoid valve SV 4 is actuated while the side brush motors 94 operate continuously. If desired, the top brush motor 111 can be placed in series with the side brush motors 94 to achieve continuous operation of the top brush motor 111.

The low pressure fluid source of approximately 175 PSI is continuously applied to the piston rod side of the top brush cylinder 132 and window brush cylinders 170. The low pressure fluid source is also applied through solenoid valve SV 2 to solenoid valve SV 3, where fluid is normally blocked. Energizing solenoid SOL 3 supplies fluid to the piston rod side of the side brush cylinders 96 and 98 while a return line is provided for the piston side of the side brush cylinders 96 and 98 through solenoid valve SV 2. A return line for the piston side of the top brush cylinder 132 and the window brush cylinders 170 is provided through solenoid valve SV 3. In this condition, top brush 106 is retracted upward and the window brushes 158 and the side brushes 76 and 78 are retracted outward.

When solenoid SOL 2 is energized, along with solenoid SOL 3, the fluid flow through solenoid valve SV 2 is reversed and hydraulic fluid is applied to the piston side of the side brush cylinders 96 and 98 by solenoid valve SV 2. A return line is provided from the piston rod side of cylinders 96 and 98 through solenoid valve SV 3 to solenoid valve SV 2. In this condition, the top brush 106 and window brushes 158 remain retracted and side brushes 96 and 98 are extended inward.

When solenoid SOL 4 is energized, with solenoid SOL 2 being de-energized, fluid flow through solenoid valve SV 3 is reversed and low pressure fluid flows from solenoid valve SV 2 through solenoid valve SV 3 to the piston side of the top brush cylinder 132 and window brush cylinders 170. Low pressure fluid is continuously applied to the piston rod side of the top brush cylinders 132 and window brush cylinders 170. Thus, the fluid on both sides of the piston provides balancing forces which reduce the effective piston area of the cylinders to the cross-sectional area of the piston rod. This results in the top brush 106 having a reduced downward biasing force and window brushes 158 having a reduced inward biasing force, and permits the top brush 106 and window brushes 158 to move along the vehicle being washed in scrubbing contact with the vehicle. In this condition, the piston side of side brush cylinders 96 and 98 has a return line through solenoid valve SV 2 and the piston rod side of the cylinders 96 and 98 has a return line through solenoid valve SV 3. Therefore, no positioning force is being applied by the hydraulic cylinders 96 and 98 to the side brushes 76 and 78 and the side brushes are held against the vehicle being washed by the mechanical linkage shown in FIG. 11.

Figure 17:
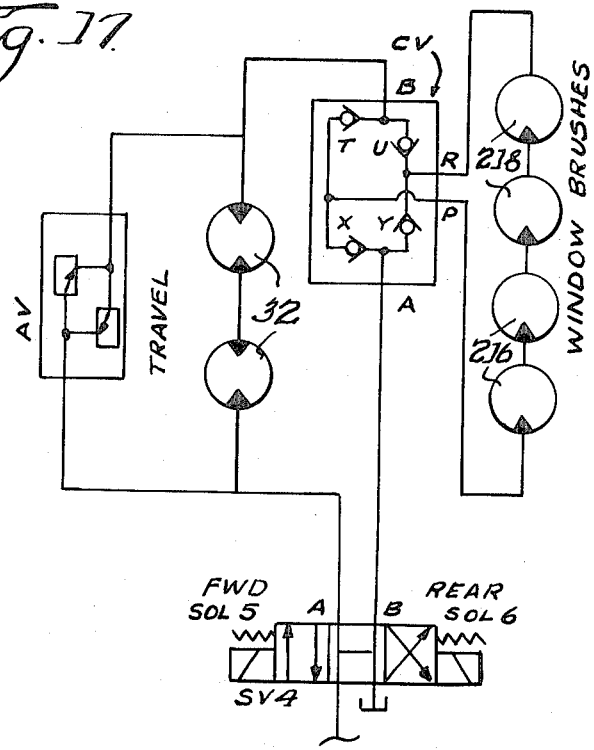
FIG. 17 is a schematic, hydraulic diagram of a modified branch of the hydraulic control circuit of FIG. 16.

Referring to FIG. 17, a modified form of hydraulic circuit for use in the seven-brush vehicle washing apparatus shown in FIG. 9, includes 4 hydraulic motors 216 and 218 for operating the 4 window brushes 210 and 212. The window brush motors 216 and 218 are connected in series with the travel motors 32 and are controlled by the solenoid valve SV 4. In the seven-brush machine, the top brush motor 111 is placed in series with the side brush motors 94.

The window brushes 210 and 212 in the seven-brush machine rotate in only one direction, as previously described. Therefore, since the fluid in the circuit branch controlled by the solenoid valve SV 4 reverses direction to reverse the rotation of the travel motors 32, a control valve CV is provided to drive the window brush motors 216 and 218 in one direction during both directions of fluid flow in the circuit branch. When the travel motors 32 are operated in a forward direction, fluid pressure is applied to port B of the control valve CV thereby locking check valves U and X, and passing fluid through check valve T to the pressure line P and on to the hydraulic motors 216 and 218. Fluid from the return line R passes through check valve Y, exits at port A of the control valve CV and returns through solenoid valve SV 4 to the reservoir. The pressure drop across the motors 216 and 218 prevents the fluid in return line R from unlocking check valves U and X. When the travel motors 32 are operated in a rearward direction, fluid flows through port A of control valve CV, locks check valves T and Y and passes through check valve X to the pressure line P thereby driving the hydraulic motors 216 and 218. Fluid from the return line R passes through check valve U and exits port B of the control valve CV. The pressure drop across the motors 216 and 218 prevents the fluid in return line R prevents from unlocking check valves T and Y. Thus, the control valve CV operates to provide a fluid output flowing in a single direction in response to fluid inputs flowing in either of two directions.

While certain preferred forms of the present invention have been described, it is to be understood that this is merely by way of example and is not to be construed in any manner as a limitation. It is contemplated that modifications may be made within the scope of the claims without departing from the spirit of the invention.

What is claimed is:

1. In a vehicle washing apparatus having brushes for scrubbing a vehicle to be washed in accordance with a washing cycle including side brushes for scrubbing sides of said vehicle and an overhead brush for scrubbing a top of said vehicle, a system comprising:
   first hydraulic means for rotating said side brushes to scrub the vehicle to be washed, said first hydraulic means being selectively operable in accordance with said washing cycle;
   second hydraulic means for rotating said overhead brush to scrub the vehicle to be washed, said second hydraulic means being selectively operable in accordance with said washing cycle;
   third hydraulic means for retracting said side brushes outward from the sides of said vehicle to be washed; and
   fourth hydraulic means for positioning said overhead brush with respect to the top of said vehicle to be washed; said fourth hydraulic means including hydraulic cylinder means for applying to said overhead brush a first force of a given magnitude to raise said overhead brush and a second force to lower said overhead brush, said second force having a magnitude reduced from the magnitude of said first force.

2. In a vehicle washing apparatus in accordance with claim 1 the system further comprising:
   valve means coupled to said hydraulic cylinder means for holding said overhead brush in a raised position, said valve means being operable to permit further raising of said overhead brush.

3. In a vehicle washing apparatus in accordance with claim 2 the system further comprising:
   control means for altering said valve means to allow said hydraulic cylinder to be operable in both raising and lowering said overhead brush.

4. In a vehicle washing apparatus having brushes for scrubbing a vehicle to be washed in accordance with a washing cycle including side brushes for scrubbing sides of said vehicle and an overhead brush for scrubbing a top of said vehicle, a system comprising:
   first hydraulic means for rotating said side brushes to scrub the vehicle to be washed, said first hydraulic means being selectively operable in accordance with said washing cycle;
   second hydraulic means for rotating said overhead brush to scrub the vehicle to be washed, said second hydraulic means being selectively operable in accordance with said washing cycle;
   third hydraulic means for retracting said side brushes outward from the sides of said vehicle to be washed;
   fourth hydraulic means for positioning said overhead brush with respect to the top of said vehicle to be washed;
   hydraulic motor means for moving said vehicle washing apparatus along the vehicle to be washed; and means for limiting the pressure of hydraulic fluid applied to said hydraulic motor means during starting.

5. In a vehicle washing apparatus in accordance with claim 4 the system wherein said limiting means comprises a relief valve coupled in bypass relationship with said hydraulic motor means.

6. In a vehicle washing apparatus having brushes for scrubbing a vehicle to be washed in accordance with a washing cycle including side brushes for scrubbing sides of said vehicle and an overhead brush for scrubbing a top of said vehicle, a system comprising:

first hydraulic means for rotating said side brushes to scrub the vehicle to be washed, said first hydraulic means being selectively operable in accordance with said washing cycle;

second hydraulic means for rotating said overhead brush to scrub the vehicle to be washed, said second hydraulic means being selectively operable in accordance with said washing cycle;

third hydraulic means for retracting said side brushes outward from the sides of said vehicle to be washed;

fourth hydraulic means for positioning of said overhead brush with respect to the top of said vehicle to be washed;

hydraulic motor means for moving said vehicle washing apparatus along the vehicle to be washed, said hydraulic motor means being reversible in response to a reversing flow of hydraulic fluid directed thereto; and control valve means for receiving said reversing fluid flow and providing an output fluid flow in a single direction, said output fluid flow being operative to cause said first hydraulic means to rotate at least one of said side brushes.

* * * * *

UNITED STATES PATENT OFFICE
CERTIFICATE OF CORRECTION

Patent No. 3,795,929                    Dated March 12, 1974

Inventor(s) WILLIAM H. THOMPSON

It is certified that error appears in the above-identified patent and that said Letters Patent are hereby corrected as shown below:

The Assignee should read -- Trans-Clean, Inc., Glenview, Ill.--

| | |
|---|---|
| Column 3, line 35 | "counterweight" should read --counterweights--. |
| Column 4, line 1 | after "the", the word "travel" should read --vehicle--. |
| Column 5, line 67 | "muunted" should read --mounted--. |
| Column 6, line 46 | "verticle" should read --vertical--. |
| Column 10, line 41 | after "the", "prevented" should read --bristles--. |
| Column 11, line 32 | "rise" should read --rinse--. |
| Column 11, line 65 | "cylinder" should read --cylinders--. |
| Column 15, line 27 | "featurea" should read --features--. |
| Column 17, line 10 | "affixe" should read --affixed--. |
| Column 17, line 24 | "step" should read --stepping--. |

UNITED STATES PATENT OFFICE
CERTIFICATE OF CORRECTION

PAGE 2

Patent No. 3,795,929          Dated March 12, 1974

Inventor(s) WILLIAM H. THOMPSON

It is certified that error appears in the above-identified patent and that said Letters Patent are hereby corrected as shown below:

| | |
|---|---|
| Column 20, line 32 | "rotatary" should read --rotary--. |
| Column 21, line 16 | "242(i a)" should read --242(a)--. |
| Column 23, line 37 | "wwhich" should read --which--. |
| Column 23, line 46 | "when" should read --When--. |
| Column 24, line 15 | "cicuit" should read --circuit--. |
| Column 24, line 47 | after the word "side", insert --brush--. |
| Column 25, line 24 | "de-enegized" should read --de-energized--. |

Signed and sealed this 17th day of September 1974.

(SEAL)
Attest:

McCOY M. GIBSON JR.          C. MARSHALL DANN
Attesting Officer             Commissioner of Patents